United States Patent [19]
Hayashi et al.

[11] Patent Number: 6,144,318
[45] Date of Patent: *Nov. 7, 2000

[54] NAVIGATION SYSTEM

[75] Inventors: Seiji Hayashi; Kihachi Hayashida; Mitsuhiro Nimura; Yasunobu Ito, all of Anjo, Japan

[73] Assignee: Aisin AW Co., Ltd., Japan

[*] Notice: This patent issued on a continued prosecution application filed under 37 CFR 1.53(d), and is subject to the twenty year patent term provisions of 35 U.S.C. 154(a)(2).

[21] Appl. No.: 08/739,709

[22] Filed: Oct. 29, 1996

[30] Foreign Application Priority Data

| Oct. 30, 1995 | [JP] | Japan | 7-281779 |
| Apr. 26, 1996 | [JP] | Japan | 8-108146 |
| Apr. 26, 1996 | [JP] | Japan | 8-108149 |

[51] Int. Cl.$^7$ .................................................. G08G 1/123
[52] U.S. Cl. ...................... 340/995; 340/988; 340/990; 701/202; 701/209
[58] Field of Search ....................... 340/995, 990, 340/988; 345/123; 701/200, 201, 202, 205, 206, 209, 210, 211; 73/178 R

[56] References Cited

U.S. PATENT DOCUMENTS

| 4,737,916 | 4/1988 | Ogawa et al. | 701/200 |
| 5,293,163 | 3/1994 | Kakihara et al. | 349/995 |
| 5,371,497 | 12/1994 | Nimura et al. | 340/995 |
| 5,396,431 | 3/1995 | Shimizu et al. | 701/213 |
| 5,398,188 | 3/1995 | Maruyama | 701/208 |
| 5,434,591 | 7/1995 | Goto et al. | 345/123 |
| 5,471,392 | 11/1995 | Yamashita | 701/200 |
| 5,613,055 | 3/1997 | Shimoura et al. | 395/173 |
| 5,614,898 | 3/1997 | Kamiya et al. | 340/995 |

FOREIGN PATENT DOCUMENTS

| 0579451 | 1/1994 | European Pat. Off. . |
| 0624860 | 11/1994 | European Pat. Off. . |
| 8805199 | 7/1988 | WIPO . |
| 9416504 | 7/1994 | WIPO . |

*Primary Examiner*—Benjamin C. Lee
*Attorney, Agent, or Firm*—Lorusso & Loud

[57] ABSTRACT

A navigation system provides road guidance by displaying information relating to roads on a structure shape map, together with landmark information, in such a manner that only information around the present position is highlighted. The system retrieves road information in the direction of travel from the present position according to the vehicle speed, or road information within a predetermined angular or distance range in the direction of travel. Information relating to roads includes information indicating a one-way road, information indicating a road into which entry is prohibited, and information indicating a pedestrian crossing and a railroad crossing. These items of information are displayed by using marks, and the landmark information is displayed by using landmarks, thereby displaying information necessary for travel in a readily perceivable manner according to the travel conditions. When the vehicle enters a parking lot in the middle of the guidance for a route to a destination, the system searches for a route from the parking lot to the destination and outputs the found route by using a structure-shape map. The parking lot in this case is one within a predetermined walking distance from the destination. If the parking lot is in close proximity of the destination, further guidance is not necessary and the guidance is terminated.

36 Claims, 16 Drawing Sheets

FIG. 2(A)
Suggested-road data

| Number (n) of roads | |
|---|---|
| 1 | Road No. |
| | Length |
| | Road-attribute data |
| | Shape-data address, size |
| | Guidance data address, size |
| ⋮ | |
| n | |

FIG. 2(B)
Shape data

| Number (m) of nodes | |
|---|---|
| 1 | East longitude |
| | North latitude |
| ⋮ | ⋮ |
| m | |

FIG. 2(C)
Guidance data

| Intersection name |
|---|
| Precaution data |
| Road name data |
| Road-name audio data address, size |
| Destination data address, size |

FIG. 2(D)
Destination data

| Number (k) of destinations | |
|---|---|
| 1 | Destination road No. |
| | Destination name |
| | Destination-name audio data address, size |
| | Destination direction data |
| | Travel guidance data |
| ⋮ | |
| k | |

FIG. 2(E)
Destination direction data

−1 : Invalidity
0 : Disused
1 : Straight ahead
2 : Rightward direction
3 : Diagonally rightward direction
4 : Direction to return to right
5 : Leftward direction
6 : Diagonally leftward direction
7 : Direction to return to left

FIG. 3(A)

Road-attribute data

Yes/No information Yes: ○

| | | |
|---|---|---|
| Overpass/ underpass data | Overpass | |
| | Alongside overpass | |
| | Underpass | ○ |
| | Alongside underpass | |
| Number of lanes | Three or more lanes | |
| | Two lanes | ○ |
| | One lane | |
| | No center line | |

FIG. 3(B)

Road name data

| Road classification | Classification No. |
|---|---|

| | | |
|---|---|---|
| Main expressway | Main road | 1 |
| | Ancillary | 2 |
| Municipal expressway | Main road | 3 |
| | Ancillary | 4 |
| Toll | Main road | 5 |
| | Ancillary | 6 |
| General roads { | National road | 7 |
| | Prefectural road | 8 |
| | Miscellaneous | 9 |

FIG. 4(A)

Precaution data

| Railroad crossing | ◯ |
|---|---|
| Tunnel entrance | |
| Tunnel exit | |
| Point of reduced width | |
| None | |

FIG. 4(B)

Travel guidance data

| Bear right | |
|---|---|
| Bear left | |
| Bear toward center | ◯ |
| None | |

NAVIGATION SYSTEM

BACKGROUND OF THE INVENTION

This invention relates to a navigation system for providing road guidance by displaying a structure-shape map and also to a recording medium for such a navigation system. Additionally, the present invention relates to a navigation system having a re-search function whereby route guidance is given according to a preset route.

A navigation system determines, responsive to input of a departing location and a destination, a route from the departing location to the destination, and provides route guidance using a screen or voice based upon a suggested route thus found. One type of guidance screen displays a map showing a present-location mark and surroundings of the present position.

However, it is often extremely difficult to precisely recognize necessary information and decide a road to be taken on the map because of a great variety of information is displayed on the map and the necessary information may be buried in the other information. In particular, at a suggested intersection, a readily perceivable intersection guide map is needed because the direction of travel must be accurately decided.

SUMMARY OF THE INVENTION

An object of the present invention is to display information necessary for travel in a readily perceivable manner according to the travel conditions and to improve the understandability of a map displayed for guidance, thereby enabling information concerning vehicular travel to be readily and accurately recognized.

Another object of the present invention is to enable appropriate guidance to be readily provided at a suggested intersection and also allow the present position to be readily ascertained.

A further object of the present invention is to enable reliable route guidance to a destination even when a vehicle has entered a parking lot.

In order to attain the foregoing objects, the present invention provides a navigation system for providing road guidance by displaying a structure-shape map showing building shapes and roads. The navigation system senses the present position. A storage or memory contains guidance information including information regarding roads, building shapes and landmark information. A display device displays a structure-shape map containing information regarding surroundings of the present position on the basis of the sensed present position and the stored guidance information. The display is controlled by selecting the displayed information regarding roads from the storage means on the basis of the present position.

In addition, the present invention provides a navigation system arranged to calculate a route to an entered destination and to provide guidance by display or voice as the present position changes. The navigation system senses the present position and calculates a route to the destination using stored route information. Information from the storage means, including landmark information, building-shape and guidance information along the calculated route, is retrieved and displayed as surroundings of the present position on the basis of the sensed present position.

Furthermore, the present invention provides a navigation system for providing road guidance by displaying a structure-shape map showing building shapes and roads wherein the navigation system reads out from a recording medium a program and data for displaying a structure-shape map illustrating building shapes and roads to provide road guidance. The program is stored in a non-volatile memory when read out from the recording medium. A display displays the structure-shape map under control of the program in the non-volatile memory on the basis of the data recorded on the recording medium to provide road guidance by displaying specific information regarding surroundings of the present position on the structure-shape map.

Still further, the present invention provides a recording medium for a navigation system which provides road guidance by displaying a structure-shape map showing building shapes and roads. The recording medium has records of structure-shape map data including information regarding the shapes of various structures, such as buildings, facilities and so forth, and related information corresponding to each of the structures, and has a program for drawing and displaying a shape and name of each structure on the basis of the structure shape map data.

In addition, the present invention provides a navigation system for a vehicle, which searches for a route to a destination and provides route guidance wherein the navigation system has a re-search function. A present-position sensing unit senses a present position of a vehicle equipped with the navigation system. An information storage device contains stored information including map information and other route information necessary for a route search and route guidance. An input unit enables entering a location such as a destination and also entering an instruction to execute a search for a route to the destination from the present position sensed by the present position sensing unit. An output unit outputs information for route guidance. A central processor executes a search for a route to the destination from the present position on the basis of the map information, temporarily stores the route found by the search, and outputs to the output unit route guidance along the route. Upon detection of entry into a parking lot, the central processor judges a distance from the parking lot to the destination, executes a re-search for a route such a walking route from the parking lot to the destination, and outputs the route found by the re-search.

Still other objects and advantages of the invention will be apparent from the following description of the preferred embodiments and the accompanying drawings.

BRIEF DESCRIPTION OF THE DRAWINGS

FIGS. 2(A), 2(B), 2(C), 2(D) and 2(E) are diagrams showing an example of an hierarchical arrangement of road-guidance and related data.

FIG. 3(A) is a diagram showing an example of the construction of road-attribute data in the data arrangement of FIGS. 2(A), 2(B), 2(C), 2(D) and 2(E).

FIG. 3(B) is a diagram showing an example of the construction of road name data in the data arrangement of FIGS. 2(A), 2(B), 2(C), 2(D) and 2(E).

FIG. 4(A) is a diagram showing an example of the construction of precaution data in the data arrangement of FIGS. 2(A), 2(B), 2(C), 2(D) and 2(E).

FIG. 4(B) is a diagram showing an example of the construction of travel guidance data in the data arrangement of FIGS. 2(A), 2(B), 2(C), 2(D) and 2(E).

FIG. 8(C) is a flowchart of a sub-routine for deciding a display mode of structure shape from category and table information of FIG. 8(B).

DESCRIPTION OF PREFERRED EMBODIMENTS

Figure 1:
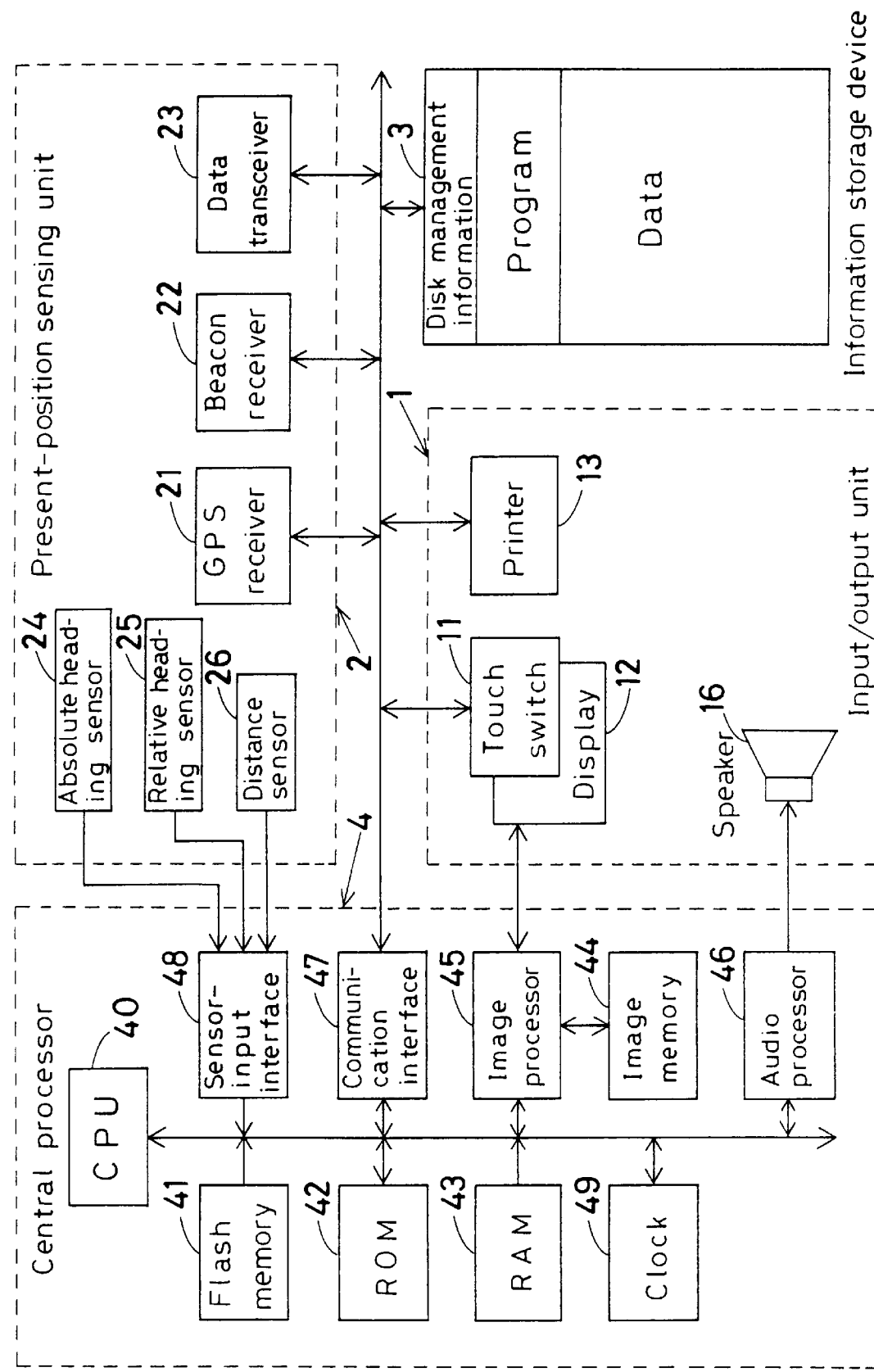
FIG. 1 is a block diagram showing an embodiment of a navigation system according to the present invention.

As shown in FIG. 1, a navigation system according to one embodiment of the present invention includes an input/output unit 1 for input/output of information relating to route guidance, a present-position sensing unit 2 for sensing information relating to the present position of a vehicle equipped with this navigation system, an information storage device 3 in which navigation data necessary for route calculation and display guidance data necessary for instructional guidance have been recorded, and a central processor 4 for executing route determination or searching, display guidance necessary for route guidance, and control of the overall system.

The input/output unit 1 enables the driver to enter destinations, to instruct the central processor 4 to execute navigation processing so that guidance information can be output by voice and/or a screen display when required by the driver, and to print out processed data. For implementing these functions, the input section of the input/output unit 1 has a touch panel 11 superimposed over the screen display for entering a destination in the form of a telephone number or coordinates on a map, and for requesting route guidance. It is also possible to use a remote controller, keyboard or other similar input device. The output section has a display 12 for displaying input data on a screen and, moreover, for automatically displaying route guidance on the screen in response to a request from the driver, a printer 13 for printing out data processed by the central processor 4 and data stored in the information storage device 3, and a speaker 16 for outputting route guidance by voice.

It is possible to add a voice recognition unit for enabling voice input and/or a record card reader for reading data recorded on an IC card or a magnetic card. It is also possible to add a data communication device for exchanging data between information sources such as an information center in which data necessary for navigation has been stored and which provides necessary data through a communication channel in response to a request from the driver, and an electronic notebook in which driver's own data, e.g. map data, destination data, etc., has previously been stored.

The display 12 is screen display device such as a color CRT or color liquid-crystal display device. On the basis of map data and guidance data processed by the central processor 4, the display 12 outputs, as a color display, all screens necessary for navigation, such as a route setting screen, a screen of an interval view and a screen of intersections. The display 12 also displays buttons for setting route guidance and for changing over guidance and screens during the route instruction. In particular, transit-intersection information such as the names of intersections to be traversed is displayed in color in the form of a pop-up menu on the interval view when required.

The display 12 is provided inside the instrument panel in the vicinity of the driver's seat. Observation of a displayed map enables the driver to ascertain the present location of the vehicle and to obtain information regarding a route from the present location to destination. The display 12 is provided with the touch panel 11 that corresponds to the display of function buttons. The operations described above are executed based upon signals entered by touching the buttons. Input signal generating means is formed by the buttons and touch panel in the input section.

The present-position sensing unit 2 has a GPS receiver 21 which utilizes the global positioning system (GPS), a beacon receiver 22, a data transceiver 23 for receiving a GPS correction signal utilizing a cellular phone or a FM multiplex signal, an absolute heading sensor 24 constituted by a geomagnetic sensor or the like, a relative heading sensor 25 constituted by a wheel sensor, steering sensor or gyro, etc., and a distance sensor 26 for sensing traveling distance from the number of revolutions of a wheel.

The information storage device 3 is an external storage device in which a program and data for navigation have been stored, for example, a CD-ROM. The program comprises an application section and an operating system (OS) section. The application section includes a map drawing part, a route determination or searching part, a route guidance part, a present-position calculating part, a destination setting operation control part, etc., and executes signal-output processing for navigation. The program part of the information storage device 3 stores programs for executing processing such as route determination or searching processing, programs for executing display-output control necessary for route guidance and for executing voice-output control necessary for voice guidance, and data necessary therefor, together with display information data necessary for route guidance and map display. The data part of the information storage device 3 stores all data necessary for the navigation system, the data comprising the files required for route guidance, such as map data (road map, residence map, structure-shape map, etc.), intersection data, node data, road data, photographic data, registered location data, destination data, suggested road data, detailed destination data, destination reading data, telephone number data, address data, and other data.

The central processor 4 comprises a CPU 40 for executing various kinds of arithmetic processing; a flash or non-volatile memory 41 for storing a program read out of the CD-ROM of the information storage device 3; ROM 42 in which is stored a program for executing program check and update processing for the flash memory 41 (i.e. program read means); RAM 43 for temporarily storing the location coordinates of a set destination, guidance information for a found route, such as the code number of a road name, and data which is in the course of being processed; an image memory 44 in which image data used to display a screen on the display unit is stored; an image processor 45 which, on the basis of a display-output control signal from the CPU 40, extracts image data from the image memory 44 and delivers the data to the display unit upon subjecting it to image processing; an audio processor 46 which, on the basis of an audio-output control signal from the CPU, combines audio, phrases, single sentences and sounds read out of the information storage device 3, converts the result to an analog signal and delivers the analog signal to the speaker 16; a communication interface 47 for performing input/output of data by communication; a sensor-input interface 48 for accepting a sensor signal from the present-position sensing unit 2; and a clock 49 for entering date and time into internal dialog information. In the central processor 4, when the sensor-input interface 48 accepts data obtained by the various sensors in the present-position sensing unit 2, the CPU 40, on the basis of the data, calculates present-location coordinates every fixed period of time, and temporarily writes the calculated present-location coordinates onto the RAM 43. The present-location coordinates are determined by executing map matching processing taking into consideration errors in detection of various data. Output values obtained from the various sensors are corrected at all times. Route guidance is so adapted that the driver is capable of selecting either a screen display or voice output.

FIGS. 2 through 5 illustrate diagrams showing an example of the construction of principal data files stored in the information storage device. FIG. 2(A) shows a data file of suggested road data. The file includes, for each of n-number of roads, a road number, length, road-attribute data, shape data address and size, and guidance data address and size. The suggested-road data is stored as data necessary for route guidance, which is obtained by route determination or search processing.

The road number is set by category of direction (outbound or inbound) for each road between branch points. The road-attribute data is data indicating road guidance auxiliary information. As shown in FIG. 3(A), the road attribute data is composed of data indicating whether a road is an overpass, a road alongside an overpass, an underpass or a road alongside an underpass, and data indicating information regarding the number of lanes. As shown in FIG. 2(B), the shape data has coordinate data which, when each road is partitioned into a plurality of nodes, comprises east longitude and north latitude for each of m-number of nodes. As illustrated in FIG. 2(C), the guidance data comprises an intersection (or branch point) name, precaution data, road name data, address and size of road-name voice data, and address and size of destination data.

Of the guidance data, the precaution data is, as shown in FIG. 4(A), data indicating information relating to railroad crossings, tunnel entrances, tunnel exits, points of reduced road width, "none", etc. This data warns the driver about railroad crossings and tunnels, etc., in addition to branch points. As shown in FIG. 3(B), the road name data is data indicating information of road category, such as expressway, municipal expressway, toll road and general road (national road, prefectural road, etc.), and information indicating whether a road is the main road or ancillary road of an expressway, municipal expressway or toll road. This data is composed of road classification data and classification numbers, namely individual number data for each road classification. As shown in FIG. 2(D), the destination data comprises destination road number, destination name, the address and size of destination-name voice data, destination direction data and travel guidance data.

Of the destination data, the destination direction data is, as shown in FIG. 2(E), data indicating information representing invalidity (meaning that the destination direction data is not used), disuse (guidance is not given), straight ahead, right direction, diagonally right direction, direction returning to right, left direction, diagonally left direction and direction returning to left. As shown in FIG. 4(B), the travel guidance data stores data for instructing the driver which lane to take when there are a plurality of lanes. The data indicates information instructing the driver to bear right, bear left, bear towards the center or "none".

Figure 5A:
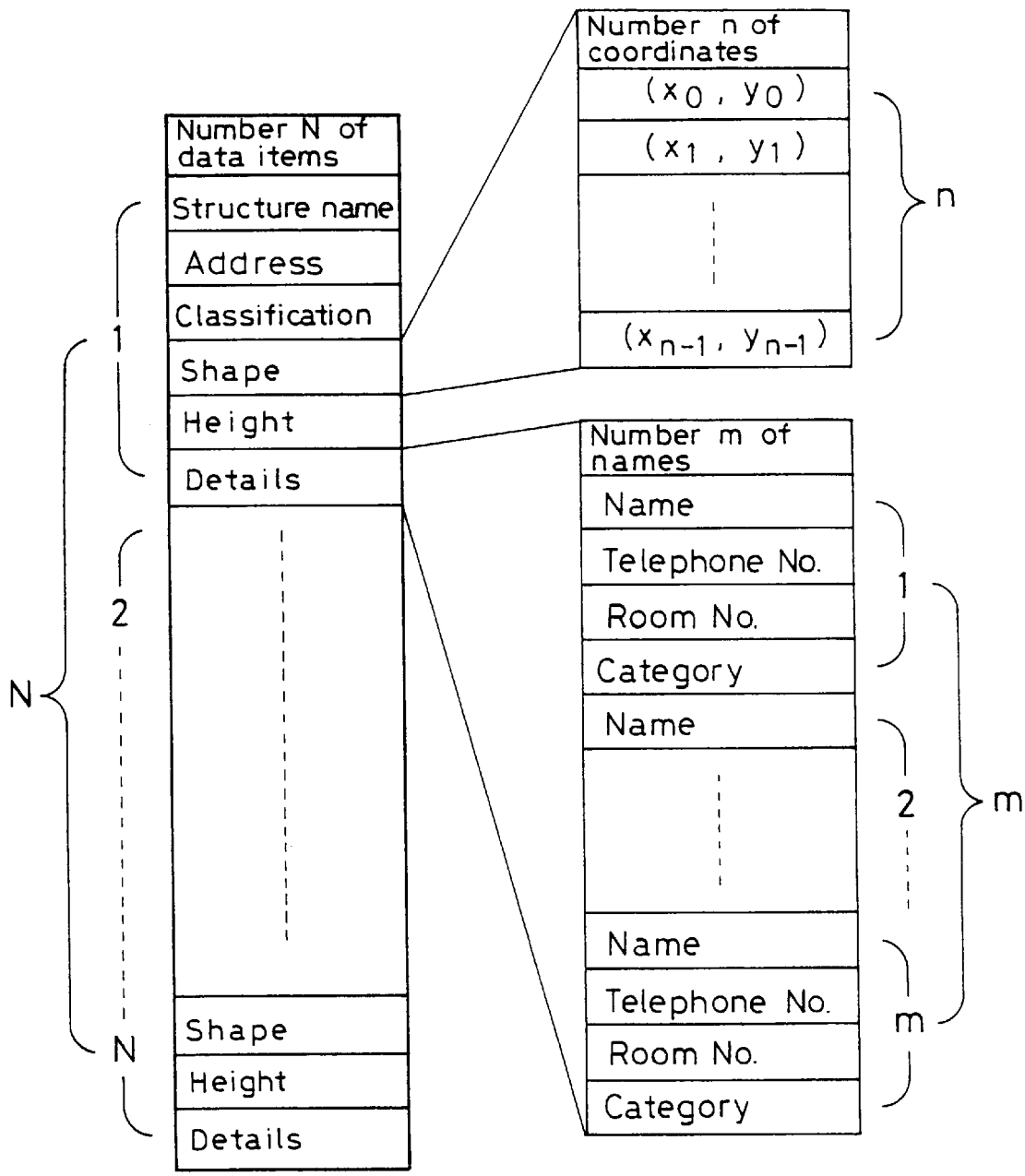
FIG. 5(a) is a diagram showing an example of the construction of data in the data arrangement of FIGS. 2(A), 2(B), 2(C), 2(D) and 2(E) for a structure-shape map.
Figure 5B:
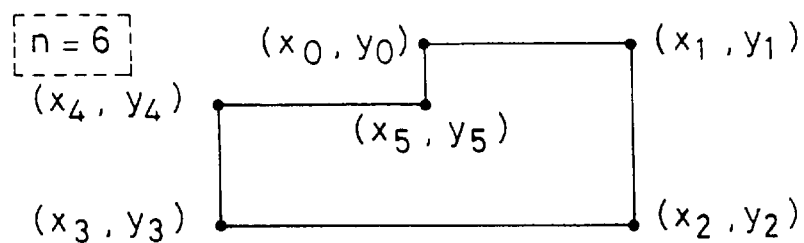
FIG. 5(B) is a diagram illustration the construction of planar structure shape for a display in a structure-shape map.

As shown for example in FIG. 5(A), data for a structure-shape map comprises the number of data items (N), i.e. the number of data items relating to structures such as buildings, bridges, towers, parks, athletic fields, roads, etc. Next to the number of data items (N), data regarding each of the N-number of structures is stored. Data regarding each structure comprises structure name, address, classification, structure shape, height and details. Regarding the structure name, if a structure is a building, the name of the building is stored. In the case of an individual's house, the resident's name is stored. For a facility, its name is stored. In the case of a road, the name of a road classification or a street's name, such as 5 "Central Street" or "National Highway No. 1", is stored. The address is the address of the structure concerned. The structure shape is data comprising the number of coordinates (n) representing a shape and coordinate values $(x_0, y_0)$, $(x_1, y_1)$, . . . , $(x_{n-1}, y_{n-1})$. The classification is information indicating structure categories, such as general houses, apartment houses, office buildings, public facilities, roads, parks, etc. The height is information indicating the number of stories or height (meters). The details are information regarding each tenant in the case of a tenant-occupied building, for example. The details comprise the number of names (m) and, for each tenant, information regarding name, telephone number, room number, category (according to type or nature of business, e.g. a family restaurant, a convenience store, etc.). Accordingly, as shown in FIG. 5(B), coordinate values are sequentially read out as information regarding a shape of a structure, and points defined by the coordinate values are connected by straight lines to draw and display a figure, thereby making it possible to output shapes of various kinds of structure, e.g. planar shapes of buildings and houses, topographic features of parks, etc. Roads can also be handled as data having a shape. Data relating to road signs, i.e. "No entry", "One-way traffic", etc., names of streets, and names of blocks as names of areas, may be constructed as data items independent of each other or as data attached to each road. In this case, marks of "No entry, "One-way traffic, etc., for example, have respective coordinate values and angles for displaying them. The same is the case with street names and block names.

Figure 6:
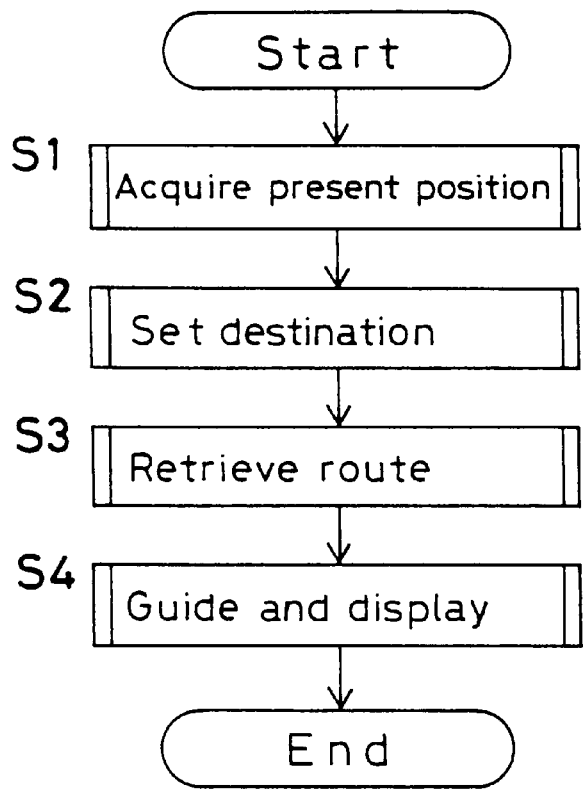
FIG. 6 is a flowchart of an overall procedure employed in the navigation system for vehicles according to the present invention.

Next, the operation will be described by first referring to FIG. 6. When the program of the route guidance system is started by the CPU 40 of the central processor 4, the present position is initially sensed by the present-position sensing unit 2, a map of surroundings centered on the present position is displayed, and the name of the present position is displayed (step S1). Next, the destination is entered or set (step S2) using a telephone number and an address, facility name and registered location, etc., after which a route from the present position to the destination is determined or searched (step S3). When the route has been determined, route guidance and display are performed continuously (step S4), until the destination is reached, while the present position is updated by the present-position sensing unit 2. If there is entry of a mid-route setting before the destination is reached, a search area is set, and a re-search is executed in the set search area. In this way, route guidance is similarly performed repeatedly until the destination is reached.

The system has means for judging a predetermined condition, and means for changing over maps from one to another when the predetermined condition is satisfied. Therefore, maps can be changed at a desired timing by a user's manual operation. Accordingly, during travel on a route decided, a road map is displayed, and if there is an mid-route location desired to be traversed, detailed information regarding surroundings of the desired facility can be provided speedily by performing a map changing operation. Thus, the user can obtain various information indicative of the position of the desired facility, the location of a parking lot, or one-way roads around the desired location, and reach the destination without fail.

In the above-described processing, a road map and a structure-shape map are displayed according to need at each of the steps of inputting, verifying and setting locations such as present position and destination, verifying a found route and providing route guidance. Next, the processing for displaying a structure-shape map using the data described in connection with FIG. 5 will be described.

Figure 7:
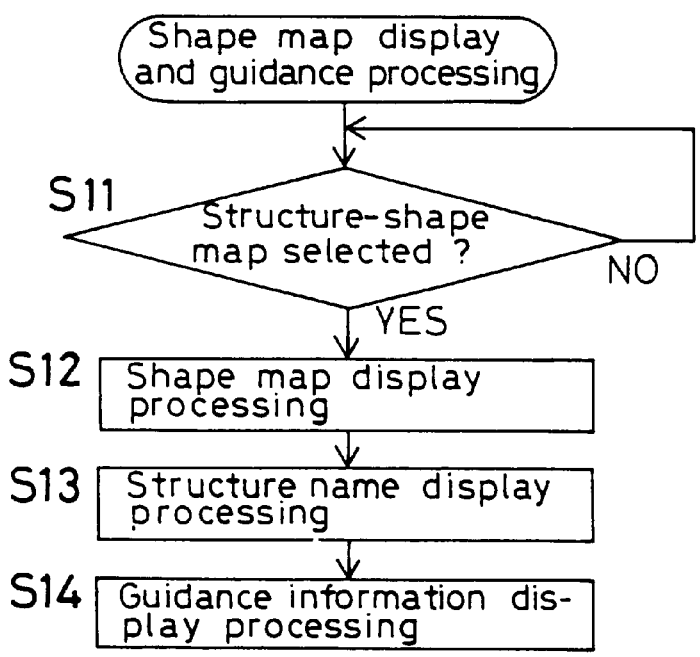
FIG. 7 is a flowchart of a procedure for displaying a structure-shape map.

Referring to FIG. 7, when a structure-shape map is selected (step S11) in the map display mode, for example, first display processing for a shape map is executed (step S12), and processing for displaying a structure name on the shape map is executed (step S13). Then, a present position mark and guidance information are displayed (step S14). In the case of a general house or building or other building structure, its planar shape is displayed as structure shape. In the case of a park or a road, its planar topography is displayed. Accordingly, in the case of a building containing a large number of residents, there is information regarding the residents of the building. Therefore, even a single structure shape may have a large amount of information. For this reason, in the shape map display processing at step S12 and in the structure name display processing at step S13, shapes of structures and public facilities which have a large amount of information are displayed in an easily recognizable form which is different from a display form for general houses. Moreover, for such structures and public facilities, their names are displayed with priority. Any overlapping names are not displayed. Furthermore, names of blocks and public facilities are given high priority. Thus, structure names are displayed in the following order: names of blocks, names of public facilities, and names of structures having a large amount information regarding their contents.

Figure 8A:
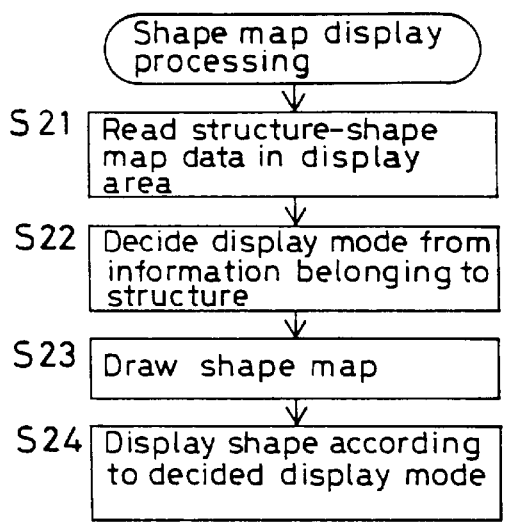
FIG. 8(A) is a flowchart of a sub-routine for displaying structure shapes in the procedure of FIG. 7.

FIG. 8(A) shows the processing for displaying structure shapes. Data regarding a structure-shape map for a display area is retrieved and read out of the information storage device 3 (step S21), and a display mode for the shape of each structure to be displayed are decided (step S22). The display mode includes colors of shapes to be displayed, color densities, and patterns thereof, as has been described above. A suitable display mode is decided according to the classification, height, and scale of construction. For example, structures can be distinguished by classification, i.e. public facilities, railroad stations, theaters, art museums, amusement parks, towers, apartment houses, and buildings other than general houses. Further, public facilities can be distinguished from each other accordingly to whether they are public institutions such as public offices, police stations, and public halls, or public facilities such as parks and athletic fields. Buildings other than general houses can be distinguished from each other by height (number of stories), the number of tenants, etc. After a display mode has been decided in this way, a structure-shape map is displayed (step S23), and each shape is displayed by coloring, shading and/or hatching the area within it according to the decided display mode (step S24).

Figure 8B:
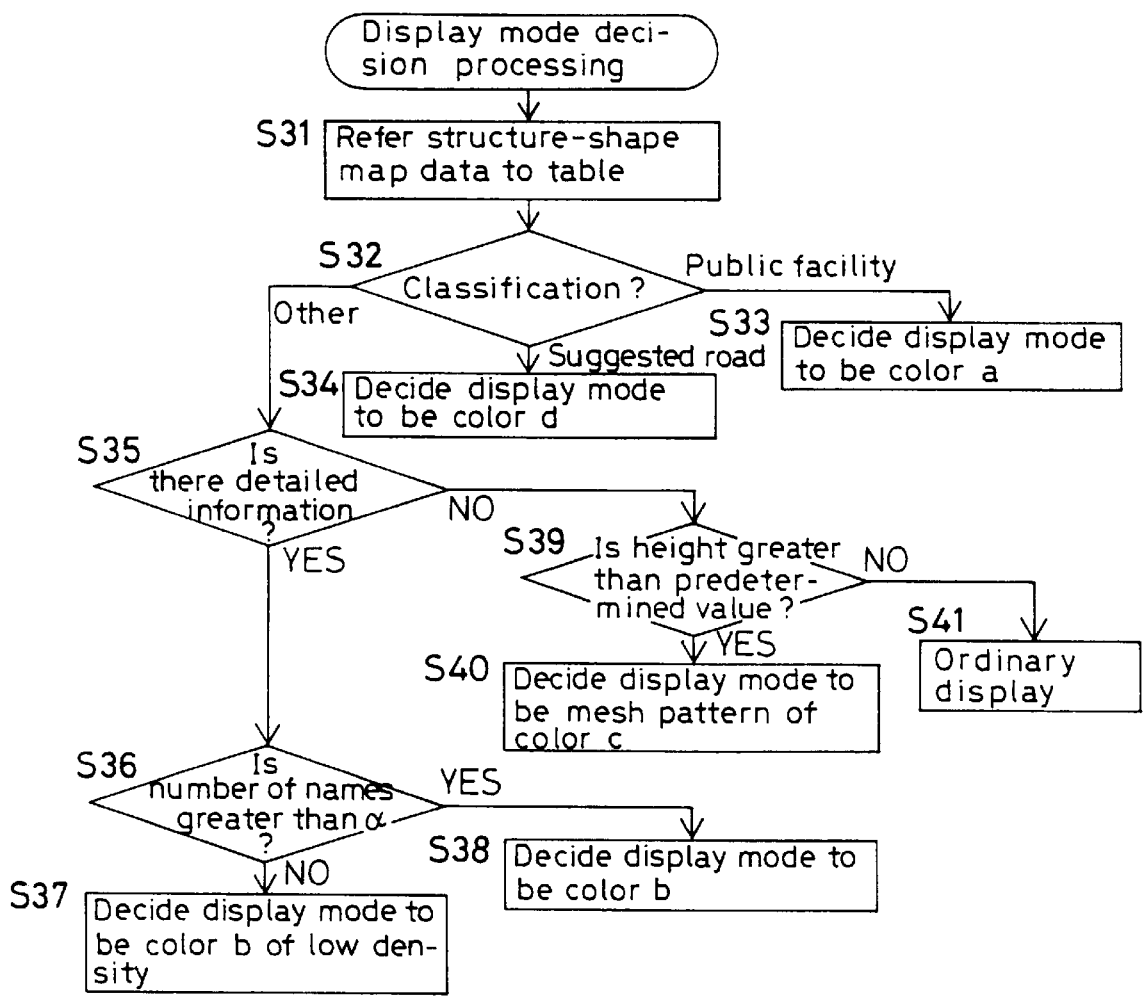
FIG. 8(B) is a table of display modes which can be selected by the sub-routine of FIG. 8(A).

If a display mode decision table such as that shown in FIG. 8(B) is registered in advance, by way of example, a display mode can be decided at step S22 by referring to data regarding a structure-shape map to be displayed and the display mode decision table. The display mode decision table shown in FIG. 8(B) is an example in which display modes such as colors, color densities, and patterns thereof are set in correspondence to the classification, height, and scale of construction. That is, in a case where a structure to be displayed is a public facility, color a is used, while color d is used for a suggested road. In a case where a structure to be displayed is neither a public facility nor a road and there is detailed information, color b is used with the color density changed according to the scale of construction of the structure. In a case where the height of the structure is more than a predetermined value, the shape is displayed in a mesh pattern of color c. Accordingly, in a case where the display mode decision table is used, the following processing is executed at step S22. First, as shown in FIG. 8(C), each item of structure-shape map data is referred to the display mode decision table (step S31), and it is first judged by classification whether the structure concerned is a public facility or a road or neither of them (step S32). If the structure is a public facility, the display mode is decided to be color a (step S33). If the structure is a road and it is on a suggested route decided by a route search (i.e. a suggested road), the display mode is selected to be color d (step S34). Because a determined route has suggested road data as has been described in connection with FIG. 2, a suggested route is drawn over the map with a width corresponding to the number of lanes based upon the suggested-road data. If the structure concerned is neither a public facility nor a road, then it is checked whether or not there is detailed information (step S35). If there is detailed information, then it is judged whether the number of names in the information is equal to or greater than a (step S36). If the number of names is equal to or greater than a, the display mode is decided to be light color b (step S37). Even when there is no detailed information, the height of the structure is checked (step S39). If the height is greater than a predetermined value, the display mode is decided to be mesh pattern of color c (step S40). In this example, whether the structure concerned is a public facility or not is given top priority when the display mode is decided. Next, priority is given to detailed information, that is, the scale of construction of the structure. Finally, the display mode is decided by height.

Figure 9:
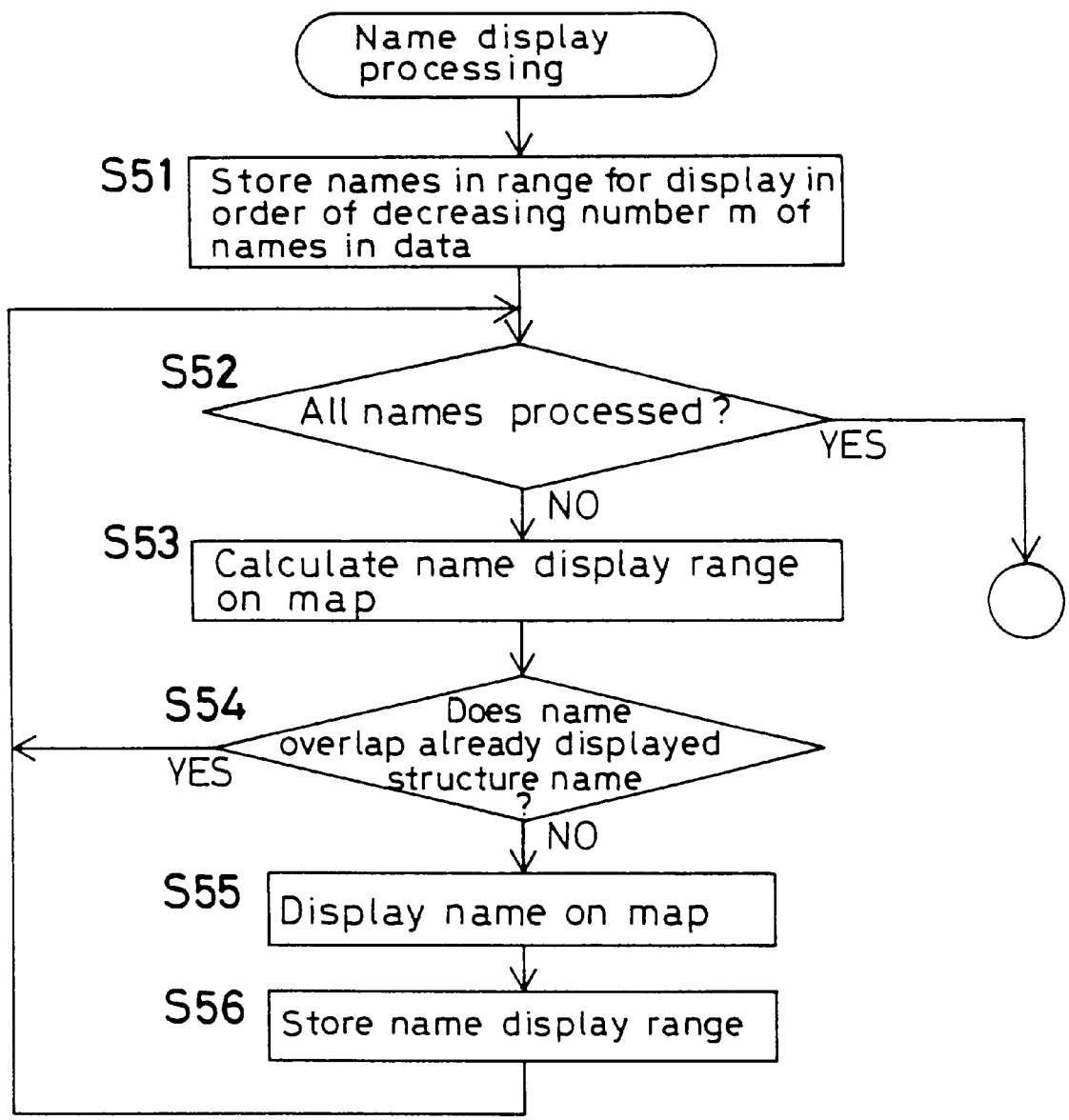
FIG. 9 is a flowchart of a sub-routine for displaying structure names in the procedure of FIG. 7.

Names displayed over displayed structures vary in length, and because of the display screen size and display area, all names cannot be displayed. Therefore, names are prioritized according to classification and amount of detailed information, for example, in the same way as in the case of decision of a display mode as described above, and a display of names is restricted within a range in which displayed names do not overlap each other. FIG. 9 shows an example of processing therefor. First, from among data within the range for display, names are stored in order of decreasing number of names (m) in the detailed information (step S51). After all names have been processed (step S52), a display range on the map is calculated for each of the names in order of decreasing number of names (m) (step S53), and names which will not overlap any of the display ranges of names already displayed (step S54) are displayed on the map (step S55). Then, the display ranges of the names are stored (step S56), and the program returns to step S52 to repeat the same processing.

Name display ranges are each determined by distributing an area for display to both sides from the center of a structure according to the number of characters based upon the length and breadth of each character and character spacing. Each name display range is stored in the form of coordinates of the upper left and lower right positions of a string of characters. If whether or not name display ranges overlap is judged by only the length and breadth of each character and the character spacing, names which are adjacent to each other at a slight spacing may be displayed all over the display screen, making the map difficult to see. Therefore, it may be judged that display ranges do not overlap when the names are spaced apart from each other more than a predetermined distance. This may be realized, for example, by a method whereby a display range is determined by providing a margin which is $\alpha$ times the character size at each of the upper and lower sides of a character string and also providing a margin which is $\beta$ times the character size at each of the left and right ends of the character string, or by setting as a margin a predetermined number of characters at each of the four sides (i.e. upper, lower, right and left sides) of a character string. Names include not only character strings but also marks generally used on maps as indications of schools, hospitals, post offices, etc. together with service marks and other various character marks and patterns.

Thus, it is possible with the structure-shape map data according to the present invention to determine by calculation a center coordinate and coordinates of a range for displaying a name from a coordinate string representing a shape. Accordingly, a name of data on the structure-shape map can be displayed in a display range, calculated from the coordinate string, over another map stored in the information storage device together with the structure-shape map. In this case, processing for displaying a map and processing for displaying a name can be executed independently of each other, and if the display coordinates of the map and those of the name are made to match each other, the map and the name can be displayed without any displacement. Such combination of processing operations enables the shape coordinate strings and names in the structure-shape map data to be mutually used for another map as data for name display. Thus, the amount of data can be reduced to a considerable extent.

Figure 10A:
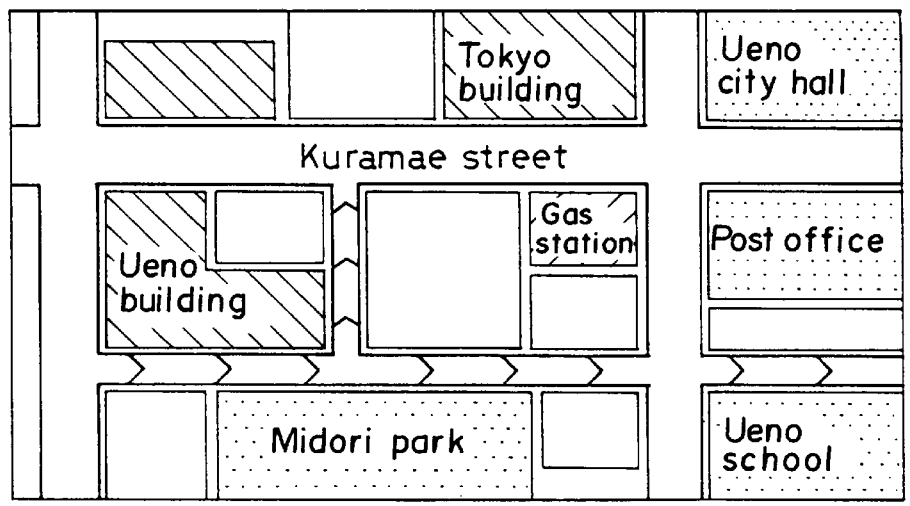
FIGS. 10(a), 10(b) and 10(c) are diagrams showing display examples of structure-shape maps under different conditions.
Figure 10B:
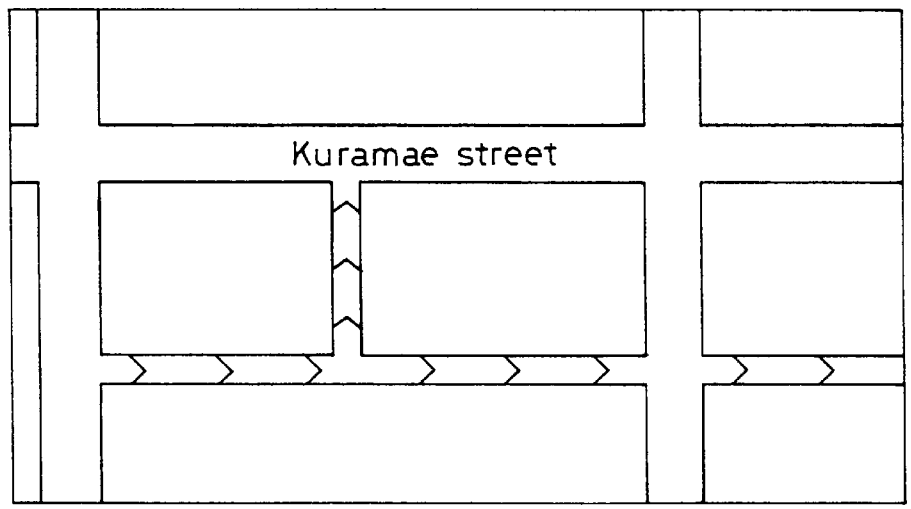
Figure 10C:
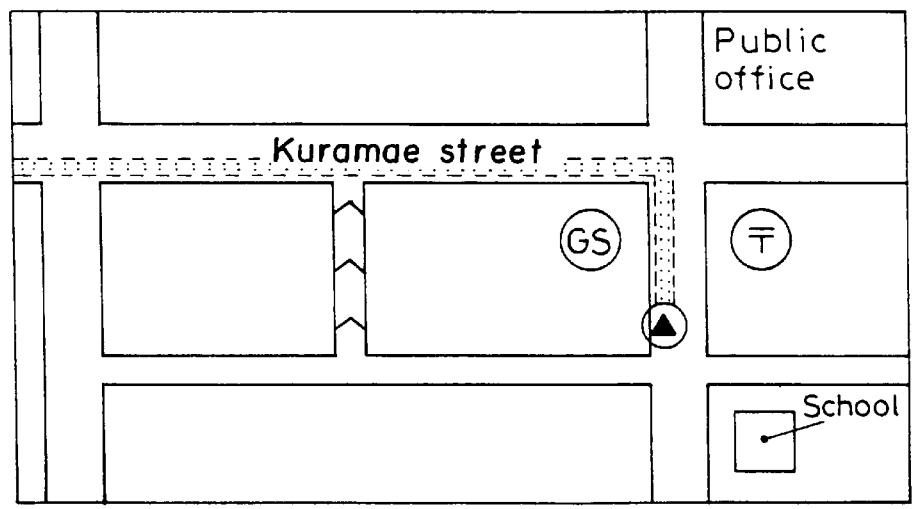

FIG. 10(a) shows a display example of a structure shape map when the vehicle is at rest. FIG. 10(b) shows a display example of a structure-shape map from which information other than information relating to roads has been deleted. FIG. 10(c) shows an example in which various displays, i.e. a route display, a present location mark display, a landmark display at a suggested intersection, and a one-way traffic mark display, are incorporated into a structure-shape map from which information other than information relating to roads has been deleted. In FIG. 10(a), names of park, public facilities and street are also displayed as names of structures, and some structures which are shown by different patterns are displayed in different display modes. In the case of color display, a distinguishable display can be performed by combining colors, color densities and patterns thereof. Therefore, the display modes are changed according to the classification information, height information, the number of names in the detailed information, etc., which are contained in the data. For example, structures which can be generally recognized as common target objects, such as public facilities, e.g. schools, city halls, post offices and railroad stations, and parks, together with tenant occupied buildings having a large number of resident names (m), are displayed in a display mode different from the ordinary display mode, thereby making it possible to readily perceive target objects in the district displayed as a map and also features of the district. FIG. 10(b) shows an example in which a structure-shape map is displayed with the drawing of building shape restricted. FIG. 10(c) shows an example in which a highlight display of information relating to roads, such as one-way traffic marks, together with a route display and a landmark display, is performed on the structure-shape map shown in FIG. 10(b). These will be described later more specifically.

The foregoing processing is executed when a structure-shape map is displayed in the ordinary mode. When a structure-shape map with a large amount of information is displayed for route guidance during travel of the vehicle, information necessary for travel may be buried in other information. Particularly when the vehicle is traveling at a speed higher than a certain level, it is difficult to recognize information by looking at a map displayed on the screen during travel. Therefore, when a structure-shape map is displayed on the guidance screen, it is also necessary to display it in such a manner that the driver can identify and recognize guidance information almost instantaneously at a glance. The following is a description of an example of such a display.

Figure 11A:
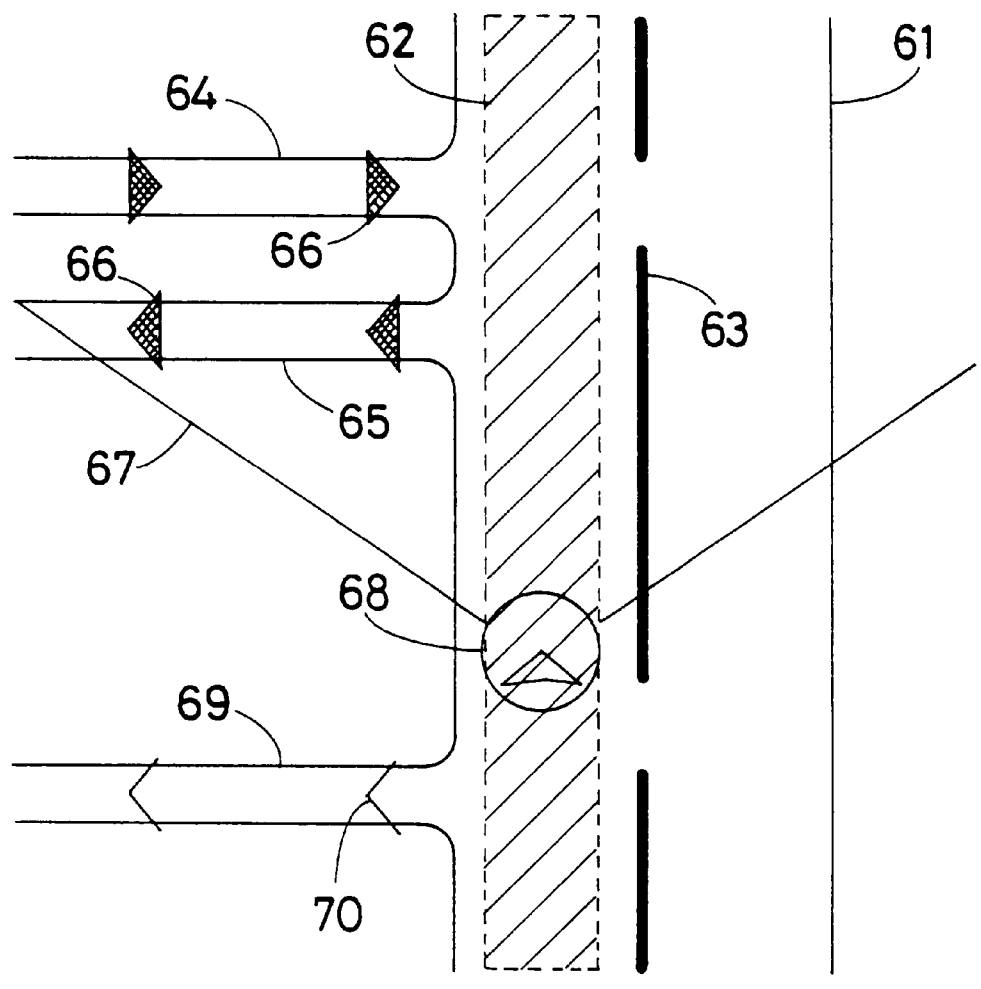
FIGS. 11(a) and 11(b) are diagrams showing examples of a guidance screen using a structure-shape map.

In FIG. 11(a), reference numeral 61 denotes a road, 62 a suggested route, 63 a center line, 64, 65 and 69 one-way roads, 66 and 70 one-way traffic marks, 67 a search range line, and 68 a present location mark.

When a structure-shape map is displayed on the guidance screen during travel, basically a road 61, one-way roads 64, 65 and 69, and a present location mark 68, which indicates the present position on the road, are displayed, as shown in FIG. 11(a). Further, as information relating to roads, information necessary for travel, such as one-way traffic marks 66, railroad crossings, pedestrian crossings, and readily recognizable landmarks lying along the road, are displayed in a readily perceivable form (highlight display) according to the travel conditions. In this case, only necessary information relating to roads around the present location is highlighted, which information may be information relating to roads within a predetermined radius of the present location, information relating to roads along the direction of travel from the present location, information relating to roads within a predetermined angular range in the direction of travel, or information relating to roads within a predetermined distance range in the direction of travel. The angular and distance ranges may be varied according to the vehicle speed such that when the vehicle is traveling at high speed, information relating to roads relatively far ahead is highlighted, whereas, when the vehicle is traveling at low speed, information relating to roads relatively near ahead is highlighted. Moreover, information relating to a calculated suggested route may be retrieved from the storage means and highlighted. It should be noted that information relating to the suggested route is, for example, information relating to roads connecting to roads on the suggested route, or information relating to roads near to roads on the suggested route. Among these items of information, the search range line 67 sets a range at a predetermined angle, e.g. +60°, ahead of the present location mark 68 to retrieve information to be highlighted. For example, the one-way traffic marks 66 are retrieved in this range and highlighted. The one-way traffic marks 70 are displayed in the ordinary mode because they are outside the search range. Before the present location mark 68 reaches the position illustrated in the figure, that is, when the present location mark 68 is short of a one-way road 69 below the position of the present location mark 68 as shown in the figure, then one-way traffic marks 70 are also highlighted. After the location of the one-way road 69 has been passed, the highlight display is changed over to the ordinary display. Accordingly, in the structure-shape map shown in FIG. 10(*a*), information unnecessary for travel, such as building shapes, are drawn in the same color as the background color or not drawn, thereby not being substantially displayed as shown in FIG. 10(*b*). The suggested route 62 is drawn with a predetermined width based upon the coordinate values and the number of lanes from the suggested-road data. To search for highlighted landmarks or the like from the position of the present location mark 68, an angular range is set for a certain direction of travel as described above. However, a search range may be set with a predetermined distance for each side ahead of the present location mark 68 on the basis of the suggested route 62. FIG. 10(*c*) shows an example in which, as shown in FIG. 10(*b*), the display of building shapes is deleted from the structure-shape map shown in FIG. 10(*a*), but the present location mark and the route are displayed instead, and in which one-way traffic marks are highlighted as information relating to roads along the route, and moreover, marks indicating a school, a post office and a gas station are displayed as landmarks.

Next, an example of display processing according to travel using a structure-shape map will be described.

Figure 12:
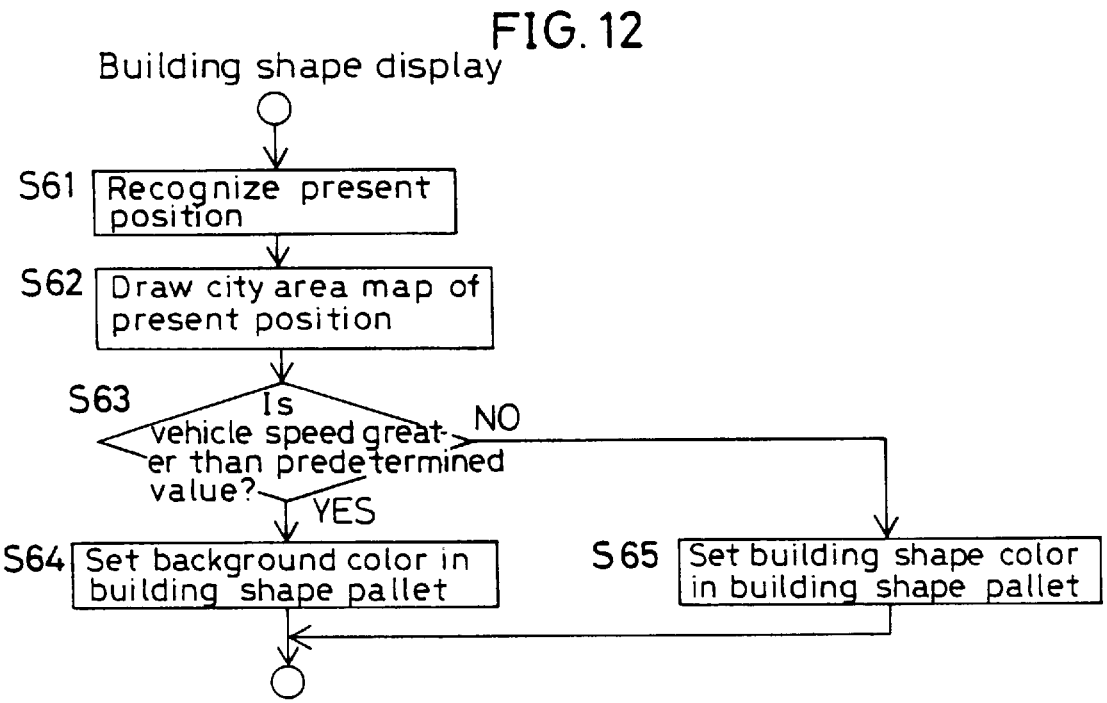
FIG. 12 is a flowchart of a sub-routine for displaying building shapes.

As a way of using a structure-shape map, for example, to find a location desired to be set as a destination from an area map displayed based upon information serving as a certain guide, it is desired to display rather detailed information. However, during travel, only information relating to roads should be highlighted. Conversely, a display of building shapes which are not related to roads, is unnecessary. Therefore, a display of building shapes is performed as follows. As shown in FIG. 12, the present location is recognized (step S61), and a structure-shape map around the present location is drawn (step S62). Then, it is judged whether or not the vehicle speed is greater than a predetermined value (step S63). If the vehicle speed is greater than the predetermined value, a background color is set in a pallet for building shapes (step S64), thereby displaying a structure-shape map as shown in FIG. 10(B), by way of example. If the vehicle speed is not greater than the predetermined value, building shape colors such as those shown in FIG. 8(B), by way of example, are set in the building shape pallet (step S65), thereby displaying a structure-shape map as shown in FIG. 10(*a*). In this processing, whether or not a building shape is related to a suggested road can be judged by the classification in the structure-shape map data, which has been described in connection with FIG. 5. Accordingly, a special kind of building shape can be excluded from objects to be judged in this processing.

In a case where the pallet for displaying building shapes which are judged to be unnecessary to display during travel on the basis of a predetermined vehicle speed is changed to the same pallet as that for the background color as described above, the building shapes are not substantially displayed on the display screen, but the drawing processing therefor is the same as in a case where building shapes are actually displayed. If display contents when the vehicle is traveling at a speed greater than a predetermined speed and those when the vehicle is at rest or traveling at low speed are changed over by changing the pallets, as described above, the display processing at the boundary region of the predetermined vehicle speed can be executed speedily. The arrangement may be such that the display control means is provided with a means for judging a predetermined condition, and when it is judged that the predetermined condition is satisfied, information necessary for display is selected from the storage means, thereby subjecting only information necessary for display to drawing processing. With this arrangement, time required for drawing processing can be reduced. Therefore, it is possible to execute drawing processing rapidly even when drawing processing must be executed at high speed, for example, when the vehicle is traveling at high speed, or when the screen is scrolled. These processing operations may be changed in response to a predetermined condition.

Figure 13:
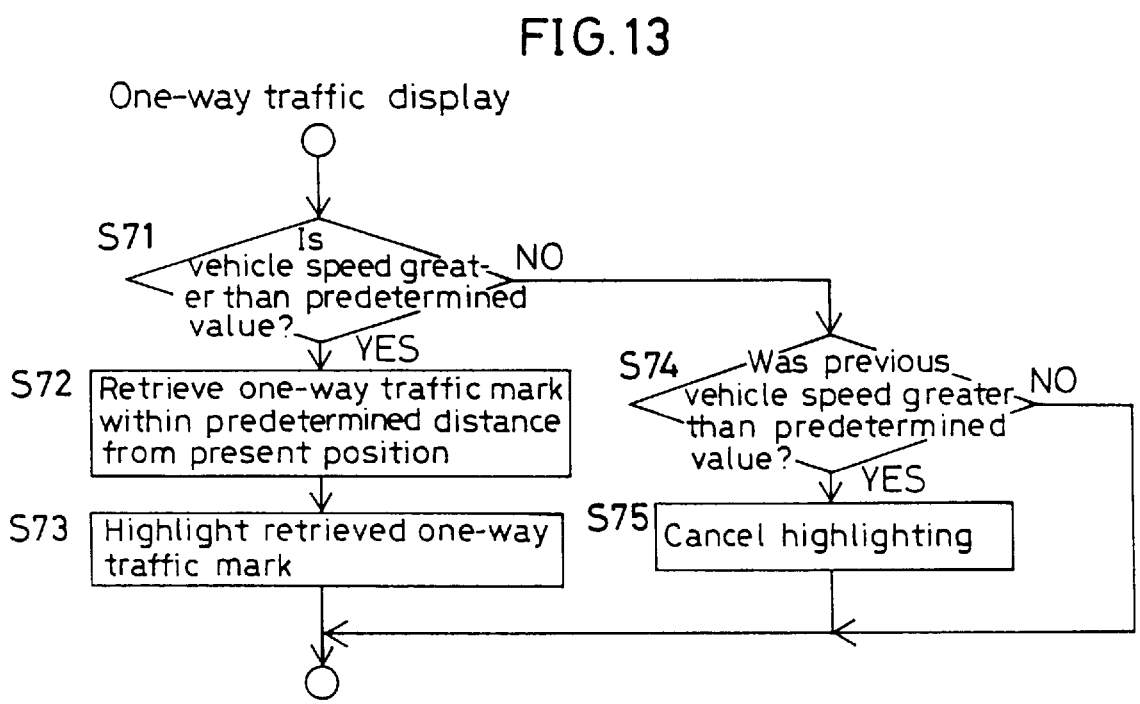
FIG. 13 is a flowchart of a sub-routine for displaying one-way traffic marks.

In contrast to building shapes, information relating to roads, such as one-way traffic marks, is sorted and highlighted as necessary information in the forward direction during travel. In the one-way traffic mark display, as shown in FIG. 13, it is judged or determined whether or not the vehicle speed is greater than a predetermined value (step S71). If the vehicle speed is greater than the predetermined value, one-way traffic marks within a predetermined distance from the present position are retrieved (step S72), and the retrieved one-way traffic marks are highlighted (step S73). However, if the vehicle speed is not greater than the predetermined value, it is determined whether or not the previous vehicle speed was greater than the predetermined value (step S74). If the previous vehicle speed was greater than the predetermined value, the highlighted one-way traffic marks are changed to one-way traffic marks displayed in the ordinary display mode (step S75). In this case, one-way traffic marks around the present location may be highlighted, or a search range may be set by distance or angle and varied according to the vehicle speed, as described above. In a case where one-way traffic marks cannot be retrieved because none of them have been registered in the structure-shape map data, one-way traffic marks may be displayed by judging whether or not each particular road is a one-way road by the classification in the road data. Not only one-way traffic marks but also other marks indicating railroad crossings, pedestrian crossings, traffic signals and so forth may be subjected to the display control described above. In particular, a road into which entry is prohibited may be highlighted. The highlighting mode may be such that information desired to be highlighted is displayed more noticeably than other information currently displayed, or only information desired to be highlighted is displayed on the screen. It should be noted that to display only information desired to be highlighted on the screen, information other than the information desired to be highlighted may be deleted from the screen, or only information desired to be highlighted may be selected and subjected to drawing processing. In the example shown in FIG. 10(*c*), a one-way road is connected to the suggested road at a position behind the present location. However, the one-way road does not lie in the direction of travel. Therefore, one-way traffic marks displayed in FIG. 10(*b*) are deleted, but only one-way traffic marks in the direction of travel are displayed, thereby being highlighted consequently.

Figure 11B:
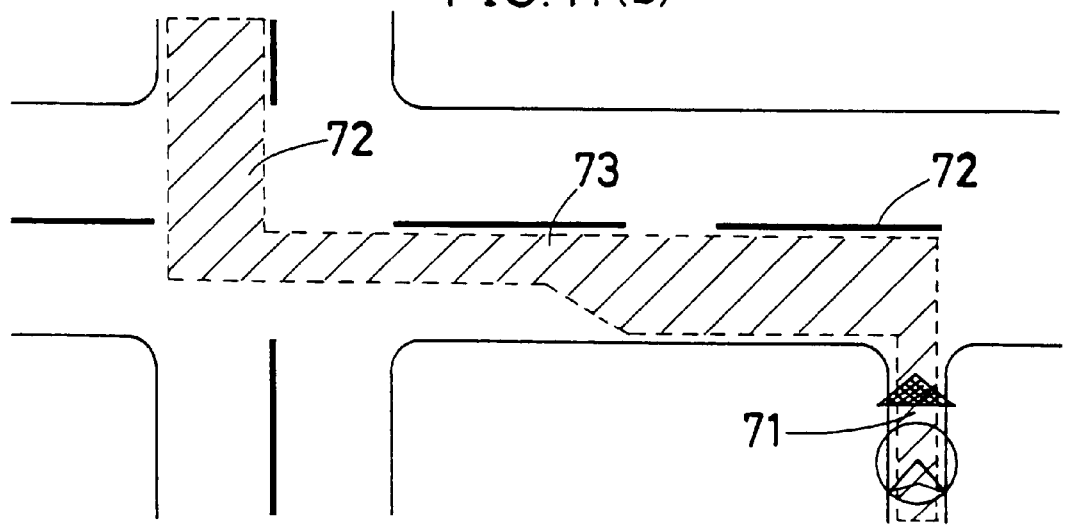
Figure 14:
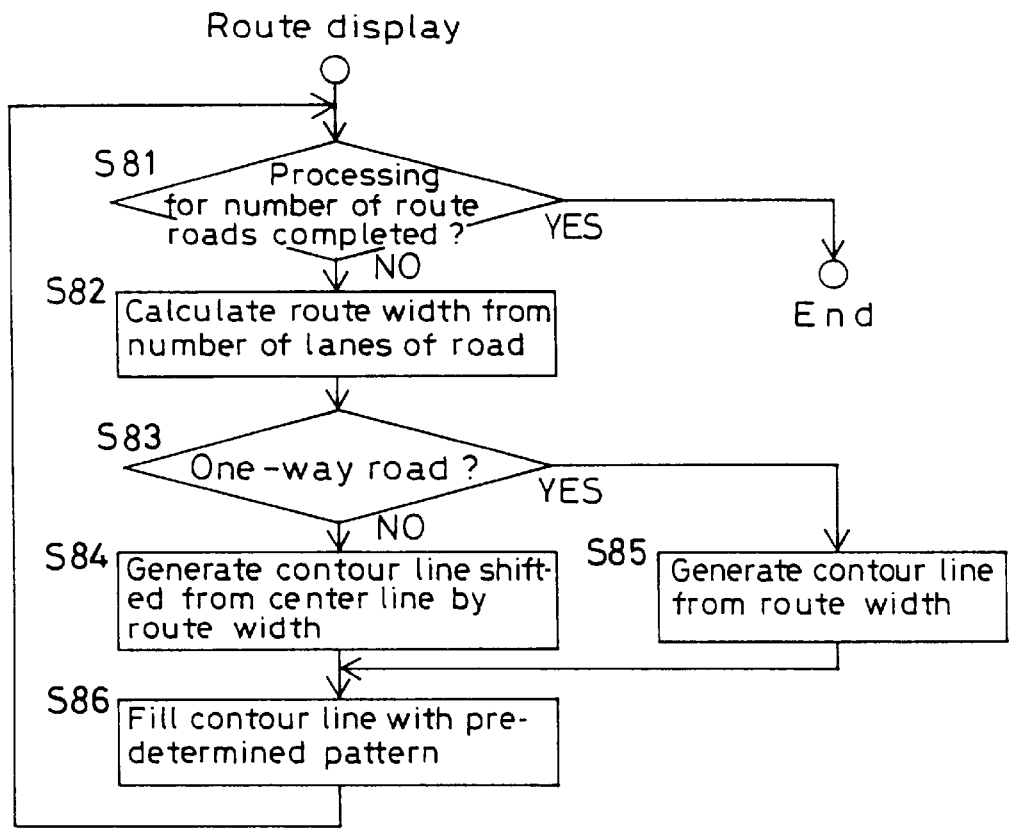
FIG. 14 is a flowchart of a sub-routine for displaying a route.

In a case where a route display is performed on a road map, the road is displayed in the form of a single line. Therefore, it is only necessary to display the road in a specific color. However, in a case where a route display is performed on a structure-shape map, lines at both sides and a center line are drawn, and the route is displayed according to the actual width. Therefore, it is necessary to display the route off the center line, that is, on the traveling lane side. In the route display, as shown in FIG. 14, the following processing is repeated (step S81) until processing for the number of route roads has been executed for each road number based upon the suggested-road data. A route width is calculated from the number of lanes of a route road (step S82), and it is judged whether or not the road is a one-way road (step S83). If it is a one-way road, a contour line is generated from the route width (step S85), If the road is not a one-way road, a contour line is generated from the route width by shifting the route by ½ of the route width, that is, by an amount to which the route extends to the opposite lane from the center line (step S84). Then, the contour line is filled with a predetermined pattern as shown at 62, 71 to 73 in FIG. 11 and in FIG. 10(*c*) (step S86).

Suggested-road data prepared from the road-map data has information regarding each road, as shown in FIGS. 2 through 4. Therefore, by utilizing the information, suggested-road data can be matched with a structure-shape map. Thus, road information, e.g. lane information and road names, can be displayed in a readily perceivable manner by displaying a route in the form of a mesh or other shaded pattern of road width. Moreover, when there are a plurality of lanes, a specific lane is selected from among them, as shown at 73 in FIG. 11(*b*) to perform a route display by utilizing information instructing the driver to bear right, bear left or bear towards the center in the travel guidance data shown in FIG. 4(B). In the route display shown in FIG. 11(*b*), the route 71 on which the present position lies is a one-way road. Therefore, a pattern is drawn in the center of the road. However, when the driver turns left from the route 71, which is a one-way road, to the route 72, which is a main street, the driver is instructed to bear towards the center as indicated by the illustrated pattern from the route 72 to the route 73 because the driver is going to turn right from the route 73 to the route 74 at the next intersection immediately after the left turn.

Figure 15:
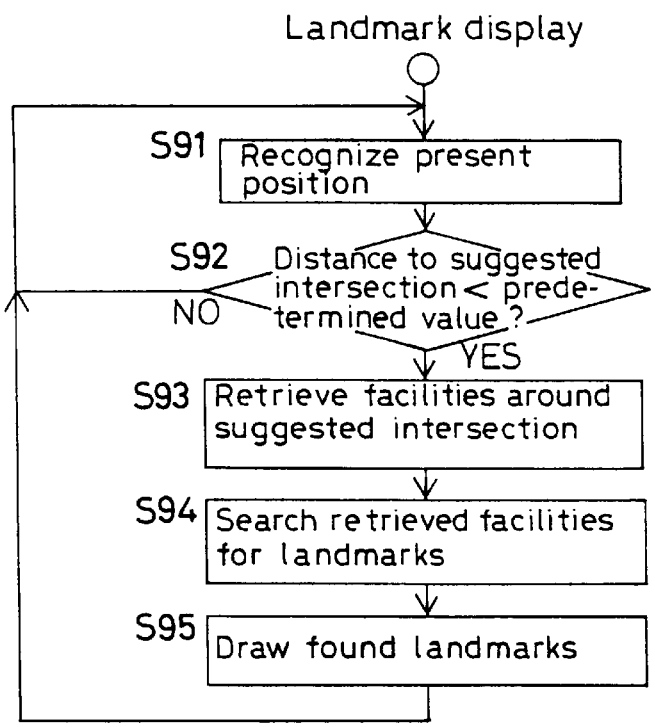
FIG. 15 is a flowchart of a sub-routine for displaying landmarks.

In a case where route guidance is provided by using a road map, when the vehicle approaches an intersection at which guidance is required, the conventional practice is to change the displayed map from the road map to a more detailed intersection guide map with a view to improving the visibility of guidance information. However, in a case where route guidance is provided by a structure-shape map, because the map itself has detailed information, even at a suggested intersection guidance can be provided by displaying characteristic landmarks without displaying an intersection guide map. In the landmark display, as shown in FIG. 15, the present position is recognized (step S91), and it is judged whether or not the distance to a suggested intersection is within a predetermined value (step S92). If the distance is within the predetermined value, facilities around the suggested intersection are retrieved (step S93). The retrieved facilities are searched for landmarks which can be displayed as landmark information (step S94), and landmarks found are drawn at the positions of the retrieved facilities (step S95). In a case where there are facilities, for example, a gas station, a bank, governmental or municipal facilities (e.g. a police station, fire station, public office, post office, school, etc.), a convenience store, a family restaurant and so forth, around an intersection at which guidance is required, landmarks comprising various patterns, e.g. service marks and character marks, indicating such facilities are displayed as shown in FIG. 10(*c*), by way of example. By doing so, intersection and route guidance can be provided in a readily perceivable manner without a need of particularly changing the displayed map from the structure-shape map to an intersection guide map as in the conventional practice. For facilities that generally have no particular marks, characters may be displayed as in the case of "Public office" shown in FIG. 10(*c*). It should be noted that the predetermined value used as a criterion for the judgment of the distance to a suggested intersection may be changed according to the vehicle speed. If a means for retrieving landmark information around the sensed present position is provided, landmarks are displayed according as the present position moves, thereby making it easy to confirm the present position. The arrangement may be such that only landmarks along a route are displayed by providing a means for retrieving landmark information around the route. Moreover, landmarks to be displayed may be controlled by retrieving landmark information lying in the direction of travel ahead of the present position. In a case where landmarks around the present position are displayed, the range or distance for retrieval may be changed according to the vehicle speed. Moreover, the arrangement may be such that retrieval is executed over a wide range, and landmark information to be displayed is selected according to the vehicle speed.

Figure 16:
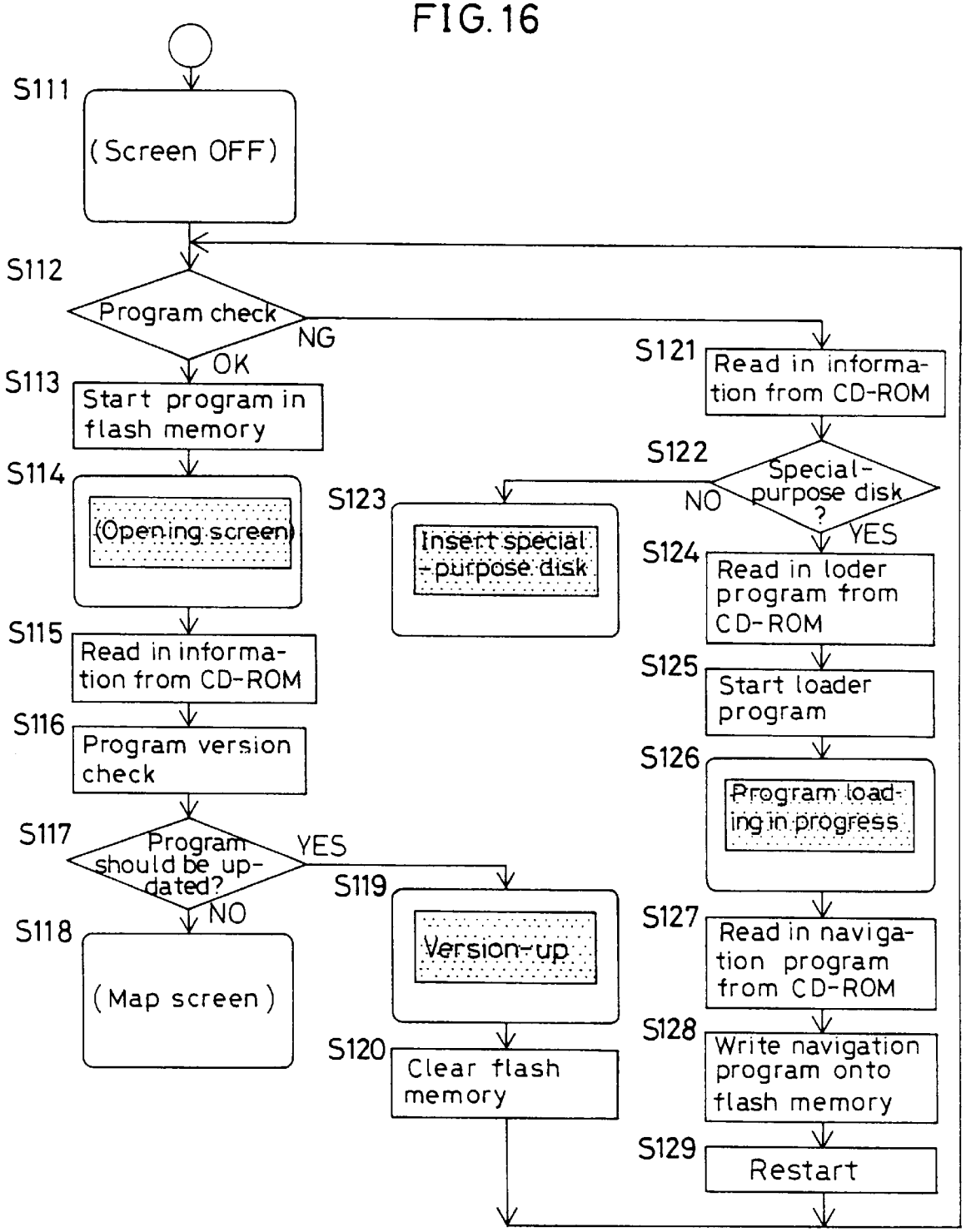
FIG. 16 is a flowchart of a procedure for loading an updated program.
Figure 17:
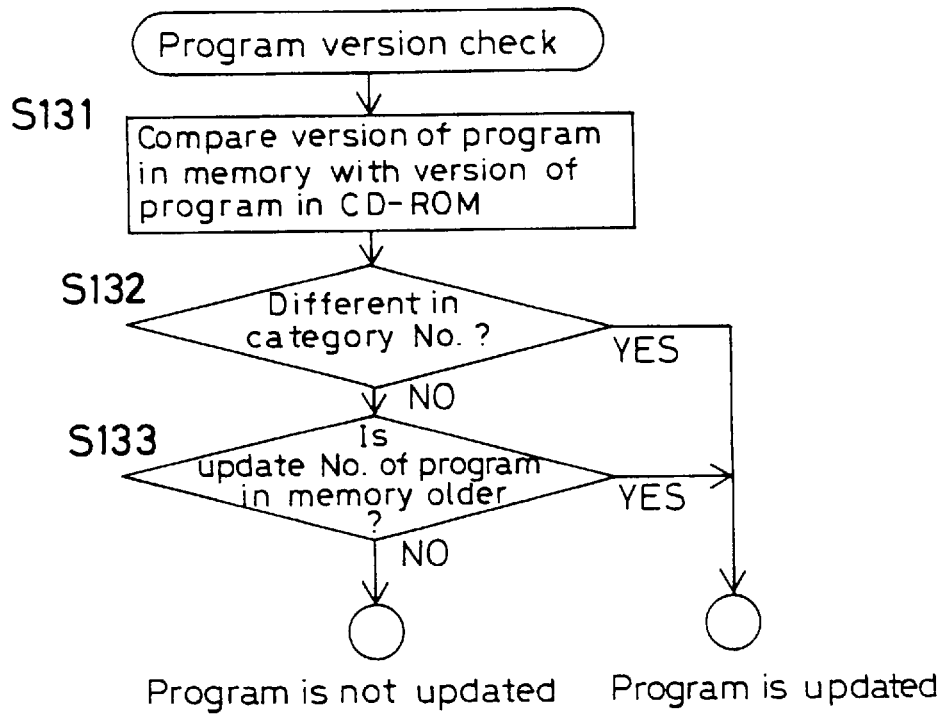
FIG. 17 is a flowchart sub-routine for checking the program version in the procedure of FIG. 16.
Figure 18:
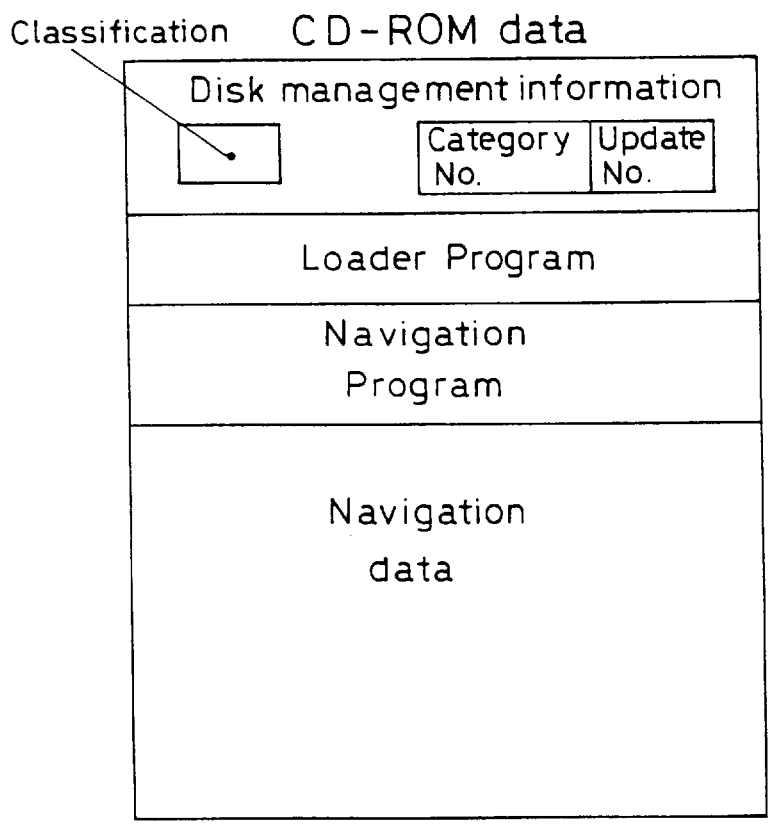
FIG. 18 is a diagram illustrating the structure of CD-ROM data.

The following is a description of the system operation for loading a program into the flash memory 41 from a CD-ROM as the information storage device 3 in which the program and data have been recorded as shown in FIGS. 16, 17 and 18.

As has been described above, the navigation system according to the present invention contains a flash memory 41 of relatively large capacity for reading in a program from a CD-ROM as an external storage device, and a ROM 42 of small capacity for storing a program (program read means) for CD boot-up processing. The flash memory 41 is a nonvolatile storage means, in which stored information is retained even when the power supply is cut off. As CD bootup processing, the program in the ROM 42, which is a program read means, is started to check the program stored in the flash memory 41, and disk management information in a CD-ROM as the information storage device 3 is read. Program loading processing (update processing) is executed by judging the disk management information and the state of the flash memory 41.

First, when the power supply is turned on, as shown in FIG. 16, with the screen left OFF (step S111), a program check is performed as to whether or not a program has been normally written onto the flash memory (step S112). If the result of the program check is OK, the program stored in the flash memory is started (step S113), and an opening screen is displayed (step S114). Then, disk management information in the CD-ROM is read in (step S115), and the program version is checked from the version No. of the program in the CD-ROM and the version No. of the program stored in the flash memory (step S116). Whether to update the program is judged on the basis of the program version comparison (step S117). If the program in the CD-ROM has not been upgraded to a version higher than the version of the program in the flash memory, the program in the flash memory is performed, without updating, to display a map screen (step S118). However, if the program in the CD-ROM has been upgraded to a higher version, the screen is changed to a version-up screen (step S119), and the flash memory is cleared (step S120). Then, the process returns to step S112.

If the result of the program check performed at step S112 is NG, disk management information in the CD-ROM is read in (step S121), and first a check is made as to whether or not it is a special-purpose disk (step S122). If it is not a special-purpose disk, a guide message to the effect "PLEASE INSERT SPECIAL-PURPOSE DISC" is displayed on the screen (step S123), whereas, if it is a special-purpose disk, a loader program in the CD-ROM is read in (step S124), and the loader program is started (step S125). Then, a message to the effect "PROGRAM LOADING IN PROGRESS" is displayed (step S126), and a navigation program in the CD-ROM is read in (step S127) and written onto the flash memory (step S128). Then, the program is restarted (step S129), and the process returns to step S112. Thus, where a program has been normally written onto the flash memory, even if a compatible CD-ROM is set, the version of the program in the flash memory and the version of the program in the CD-ROM are compared with each other, and only when the CD-ROM has an upgraded program, the program in the flash memory is updated. By doing so, the system can always be operated by the latest program without useless program loading.

In the version check processing at steps S116 to S117, as shown in FIG. 17, the version of the program in the flash memory and the version of the program in the CD-ROM are compared (step S131), and a check is made as to whether the two programs are different in category No. from each other (step S132). If the two programs are not different in category No., a check is made as to whether or not the update No. of the program in the flash memory is older than that in the CD-ROM (step S133). If the two programs are different in category No., or if the update No. of the program in the flash memory is older than that in the CD-ROM although the two programs are not different in category No., the program is updated. If the two programs are not different in category No. and the update No. of the program in the flash memory is not older than that in the CD-ROM, the program is not updated.

As shown for example in FIG. 18, the structure of the CD-ROM data comprises disk management information, a loader program, a program for navigation, and data for navigation. The disk management information possesses information such as classification of the CD-ROM (e.g. CD-ROM for navigation, CD-ROM for music, CD-ROM for video, etc.). If the CD-ROM is for navigation, the disk management information further has category No. for classification by use application, that is, whether the CD-ROM is a district version or nationwide version and used for sightseeing or leisure, and classification by genre. The disk management information also includes an update No. In the case of a CD-ROM for navigation, if it is a district version, CD-ROM data has its area in the form of coordinates, thereby enabling the district to be identified by the coordinates. As has been described above, the program for navigation comprises an application section and an OS section. The application section includes a map drawing part, a route determination part, a route guidance part, a present position calculating part, a destination setting operation control part, etc., and executes signal output processing for navigation. The navigation data includes map data, search data, guidance data, map matching data, destination data, etc.

In a case where a CD changer is used in combination with the program read means, CDs can be automatically changed over based on an changeover instruction. When a CD is designated, processing for reading CD disk management information (disk label) is executed, and a CD to be driven is selected by judging the contents of the disk management information. If the selected CD is a CD for navigation, the category No. and update (version) No. of the selected CD are checked, and the above-described program memory update processing is executed.

It should be noted that the present invention is not limited to the foregoing embodiment but can be modified in a variety of ways. For example, in the foregoing embodiment, one-way traffic marks, railroad crossings, and pedestrian crossings are taken as examples of information necessary for travel, it is also possible to display traffic signals at intersections, intersection names attached to traffic signals, road destination guide boards provided before intersections. In the case of highlight display, the display color may be changed according to the contents of each displayed information. A changeover of maps may be so performed that a road map is displayed for guidance before the vehicle approaches the vicinity of a destination, and the map is changed over to a structure-shape map on condition that the vehicle has approached the vicinity of the destination.

Although landmarks are displayed as landmark information, particularly high or special structures such as towers may be displayed as landmark information by searching the information concerning height and classification in the structure-shape map data.

As will be clear from the foregoing description, according to the present invention, marks indicating one-way traffic roads, pedestrian crossings, railroad crossings, etc. are displayed on a structure-shape map in a highlighted form according to the vehicle speed as information regarding surroundings of the present position or information relating to roads lying in the direction of travel. Therefore, information necessary for travel can be displayed in a readily perceivable form according to the travel conditions. Moreover, because information regarding surroundings of the present position and landmark information are retrieved and displayed on a structure-shape map, it is possible to give guidance for a suggested intersection with the structure shape map being displayed as it is without particularly using an intersection guide map. Furthermore, it is possible to readily ascertain the present position by retrieving landmarks along the direction of travel from the present position and displaying the retrieved landmarks on the structure-shape map.

The following is a description of another embodiment of the present invention in which a structure-shape map is utilized for a re-search from the vicinity of a destination.

There are cases where, although a route to a destination has been found by a route search using a navigation system for vehicles, the user cannot go to the destination by car because there is no place for parking at the destination. In such a case, the user will find a parking lot on the way to the destination along a found suggested route, or he or she will search for a parking lot near the destination after reaching the destination. In the case of a district unfamiliar to the user,. if there is a parking lot in the immediate neighborhood of the destination (i.e. in close proximity of the destination), it will be possible to reach the destination without guidance.

However, if a parking lot is distant from the destination, the user may have to make efforts to search for the parking lot, and while doing so, may lose his/her way to the destination from the parking lot. When the user has lost his/her way to the destination from the parking lot, he or she must find a positional relationship between the suggested route or the destination and the parking lot and newly instruct the system to search for a route to the destination from the parking lot as a present position. The following is a description of a system designed to execute a re-search by using a structure-shape map on such an occasion.

Figure 19:
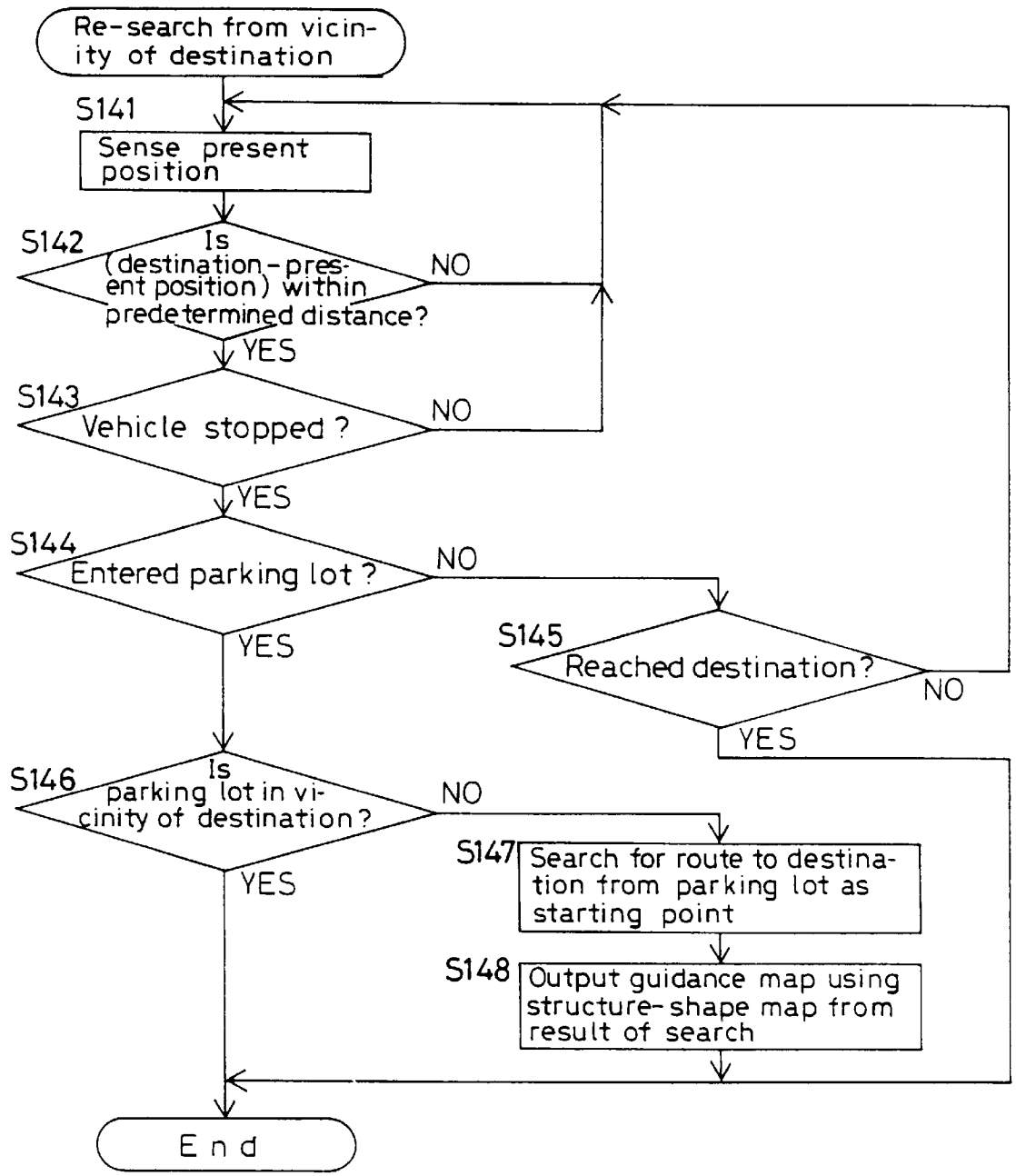
FIG. 19 is a flowchart of a procedure for conducting a re-search from a parking lot within predetermined distance from a destination.

As shown in FIG. 19, first the present position is sensed (step S141), and a check is made as to whether or not (destination—present position) is within a predetermined distance (step S142), that is, as to whether or not the present position is within a predetermined distance, e.g. 1 km, from the destination. If the present position is within the predetermined distance, a check is made as to whether or not the vehicle has stopped (step S143). If the vehicle has stopped, then a check is made as to whether or not the vehicle has entered a parking lot (step S144). If the present position is not within the predetermined distance from the destination, even if the vehicle enters a parking lot, it can be judged as an mid-route location on the way to the destination. Therefore, the present position is maintained and guidance along the determined route continues by continuing to check the present position. Even if the present position is within the predetermined distance from the destination and if the vehicle does not stop, guidance along the determined route continues by continuing to check the present position. When if the vehicle has stopped but is not in a parking lot, the guidance is similarly continued until the destination is reached (step S145). If the vehicle has entered a parking lot, a check is made as to whether or not the parking lot is in close proximity of the destination, for example, within 300 m from the destination (step S146). If the parking lot is in close proximity of the destination, it is judged that guidance to the destination is not necessary, and the process is terminated without executing any particular processing. If the parking lot is not in close proximity of the destination, a route to the destination from the parking lot as a starting point is re-searched (step S147), and a guide map is displayed or printed out in the form of a structure-shape map based on the result of the re-search (step S148).

By re-searching, upon detection of entry into a parking lot, for a route from the parking lot to the destination and outputting the found route, as described above, it is possible to reliably guide the user to the destination even in a case where he or she cannot go directly to the destination by car. Moreover, in a case where the vehicle has stopped, entry into a parking lot is detected from the present position, and whether a re-search is necessary or not is decided by judging whether the user has entered the parking lot on his/her way to the destination or to go from the parking lot to the destination on foot according to whether the parking lot is within a predetermined distance from the destination, and whether the parking lot is not in close proximity of the destination. The above-mentioned predetermined distances are set as follows: The first mentioned distance is set, for example, at 1 km as a walking distance and also as a distance by which a parking lot may be judged to be a place where one may stop on his/her way to the destination. The second-mentioned distance is set, for example, at 300 m as a range very close to the destination from which one can readily reach the destination without guidance. However, these distances may be changed as desired, as a matter of course.

In the case of a route for guiding a person traveling by a vehicle to a destination, it is an effective way to display the present position on a road map, an intersection map, or the like while following it up. However, a route found by a re-search which is executed on condition that the vehicle has entered a parking lot is a suggested route for the user to go to the destination on foot with his/her vehicle left in the parking lot. Accordingly, the guidance therefor is different from the ordinary guidance, which is performed by displaying the present position while following it up. Therefore, a structure-shape map, which enables the user to readily perceive features of structures along a route to a destination, is more useful than conventional maps such as a road map, an intersection map, etc. As has been described above, a structure-shape map is arranged such that coordinate strings stored as shape data in the structure-shape map data are sequentially read out, and points defined by each coordinate string are connected by straight lines to draw and display a figure, and a name is displayed over each displayed figure. The structure-shape display processing is shown in FIG. 8(A) and 8(C), and the structure name display processing is shown in FIG. 9.

Figure 20:
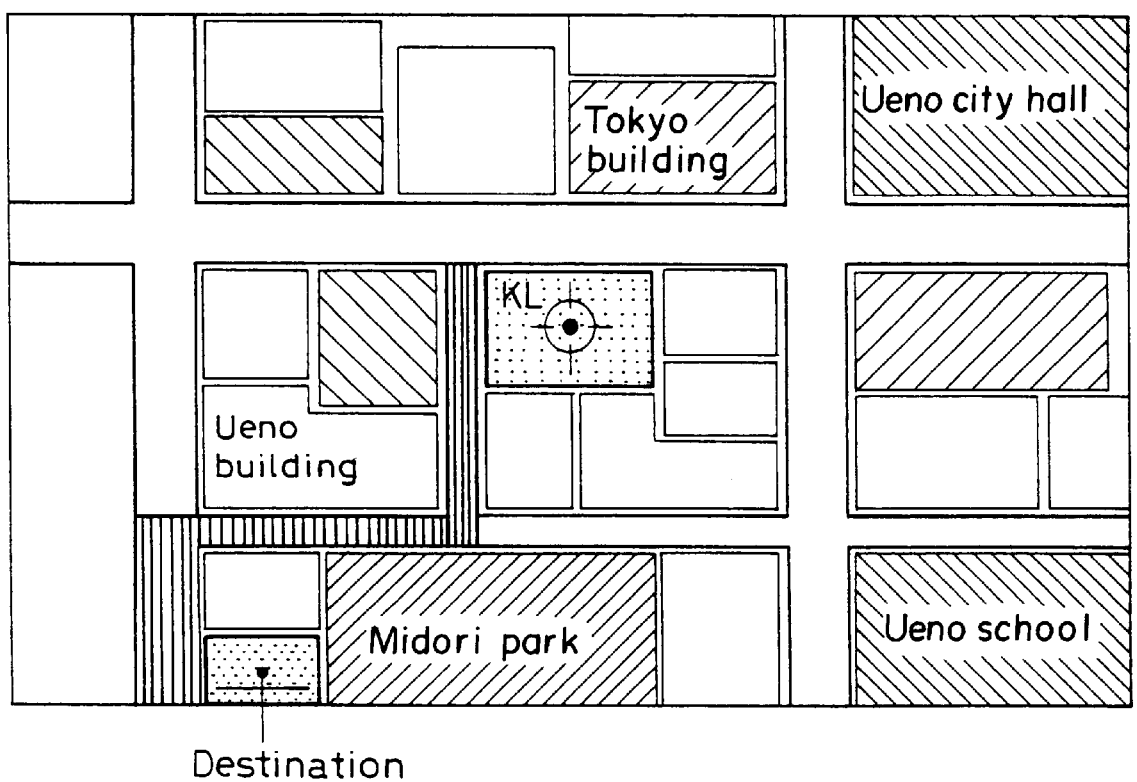
FIG. 20 is a diagram showing an example of a display of a map for route guidance from a parking lot to a destination using a structure-shape map.

FIG. 20 shows an example of a map for route guidance from a parking lot to a destination, which is found by the above-described re-search processing executed from the vicinity of the destination and displayed by using a structure-shape map. The route guidance map using a structure-shape map highlights the shape of a parking lot, which is the present position, in the center of the map, together with a cursor KL represented by a combination of a circle and a cross, and also displays the shapes of structures around the parking lot. It should be noted that, according to the structure-shape map data shown in FIG. 5, if a structure is a parking tower or a parking lot, information indicating it is stored in the classification. If a structure is a building having an underground, rooftop or other indoor parking area, information indicating the parking area is stored in the category in the details of the structure-shape map data. Therefore, a parking lot can be retrieved from either the classification or the category in the structure-shape map data. A destination is also highlighted together with a route from the parking lot to the destination. Among the displayed structures, those which are judged to be of high utility in terms of information from the classification information, the height information, the number of names in the details, etc., which are contained in the data, are displayed in a display mode different from the display mode for general structures. Names of principal structures, such as the names of public facilities, large buildings, parks and streets, are displayed in a predetermined order of precedence so that no names overlap each other. Among the structures, those which are shown by some different patterns are displayed in different display modes. In the case of a color display, a distinguishable display is performed by combining colors, color densities and patterns thereof. For example, public facilities, e.g. schools, city halls and railroad stations, and parks, together with tenant-occupied buildings which are large in the number of names (m), are displayed in a display mode different from the ordinary display mode, thereby making it possible to readily perceive target objects in the district displayed as a map and also features of the district. outputting a route to a destination by using a structure-shape map as described above provides the following advantageous effect: In a case where there is no place for parking at the destination, and the user reluctantly parks his/her vehicle at a parking lot found in the periphery of the destination and goes to the destination on foot, it is possible to provide the user with readily understandable route guidance, which is different from guidance using a road map for travel by vehicle. That is, because a route to the destination to be reached on foot is displayed, it is possible to confirm, according to need, building names and shapes of public facilities and other structures one by one on his/her way to the destination, such as "Ueno building" in the corner where a right turn should be made, "Midori park" at the end of the street, etc.

It should be noted that the present invention is not limited to the foregoing embodiment but can be modified in a variety of ways. For example, in the foregoing embodiment a re-search is executed upon detection of entry into a parking lot. In this regard, parking lots may include, needless to say, not only general parking areas such as pay parking lots and free parking areas but also other structures such as facilities, buildings and parks which have spaces reserved for parking, and roads equipped with parking meters. Further, in the foregoing embodiment, a re-search from the present position to the destination is executed when entry into a parking lot is detected on condition that the present position is within a predetermined distance from the destination but not in close proximity of the destination, the system may be arranged to enable a selection to be made as-to whether to execute a re-search or not. The system may also be arranged to enable a section to be made as to whether only a display of the re-search result should be provided or the result should be printed out as well as displayed. Further, the system may be arranged such that even in a case where the present position is not within the predetermined distance, a re-search from the present position to the destination is executed upon selection of re-search processing, by way of example. That is, in such a case, it may be considered that the user has temporarily stopped in the parking lot for some purposes. Therefore, in this case, the user will travel to the destination by the vehicle instead of going to the destination on foot. Accordingly, the system provides route guidance using not a structure-shape map but a road map as an ordinary navigation system for vehicles.

As will be clear from the foregoing description, according to the present invention, entry into a parking lot is detected in the periphery of a destination, and re-search for a route to the destination is executed according to whether the parking lot is in the vicinity of the destination, or within a predetermined distance from the destination. Accordingly, even in a case where there is no parking lot on the premises of the destination, it is possible to surely provide guidance for the route from the parking lot to the destination. In a case where it is possible to park in the neighborhood of the destination, for example, on the premises of the destination or a land adjoining thereto, the user needs no guidance. Therefore, a predetermined distance range is set in the neighborhood of the destination. Thus, in a case where the user has successfully parked in close proximity to the destination, re-search for a route is not executed. This makes it possible to eliminate useless guidance. If the arrangement is such that a route found by re-search can be output in the form of a structure-shape map by a printer or other output unit, the user can follow the route to the destination while making a check on the map.

What we claim is:

1. A navigation system for providing road guidance by displaying a structure-shape map showing shapes of buildings, facilities, and roads, said navigation system comprising:

present-position sensing means for sensing a present position;

vehicle speed sensing means for sensing vehicle speed;

storage means containing stored structure-shape map data including shape information representing shapes of structures, said structures including at least roads, facilities and buildings, and information regarding said structures linked to said shape information;

display means for displaying the structure-shape map with the sensed present position indicated thereon, based on the shape information; and display control means for, in one mode of operation, controlling information displayed as said structure-shape map on said display means in accordance with movement of the sensed present position, restricting the quantity of shape information which is displayed on said display means to shape information for structures within a predefined area around the present position, on the basis of the sensed vehicle speed, for selecting items of said information regarding said roads from said storage means on the basis of the sensed present position, and for drawing, within an area smaller than the displayed structure-shape map, only the selected items of said information regarding said roads overlaid on the respectively related shapes of roads on the displayed structure-shape map.

2. The system according to claim 1, wherein said present position sensing means has vehicle speed sensing means for sensing vehicle speed, and said display control means restricts the quantity of shape information which is displayed on said display means, to shape information for structures within a predefined area around the present position, on the basis of the vehicle speed sensed by said vehicle speed.

3. The system according to claim 1, wherein said display control means, in a second mode of operation, retrieves information relating to roads and other structures around the present position, identifies certain items of information regarding roads, among the retrieved information as necessary information and highlights said certain items of necessary information on the structure-shape map.

4. The system according to claim 3, wherein said display control means highlights a mark indicating at least one of said certain items of information.

5. The system according to claim 3, further comprising vehicle speed sensing means for sensing vehicle speed, wherein said storage means further contains landmark information and wherein said display control means retrieves items of said shape information for structures within a range in a direction of travel from the present position and, in said second mode of operation, retrieves a portion of said landmark information for landmarks within said range, said range being varied according to the sensed vehicle speed.

6. The system according to claim 3, wherein said storage means further contains landmark information and wherein, in the second mode of operation, said display control means retrieves said shape information within a predetermined angular range in a direction of travel and retrieves a portion of said landmark information for landmarks within said range.

7. The system according to claim 3, wherein said storage means further contains landmark information and wherein said display control means, in said second mode of operation, retrieves items of said structure shape information for structure within a predetermined distance range in a direction of travel and retrieves a portion of said landmark information for landmarks within said range.

8. The system according to claim 1, wherein said information regarding said roads includes a road sign.

9. The system according to claim 1, wherein said information regarding said roads includes information indicating a one-way road.

10. The system according to claim 1, wherein said information regarding said roads includes information indicating a road into which entry is prohibited.

11. The system according to claim 1, wherein said information regarding said roads includes road information indicating a pedestrian crossing or a railroad crossing.

12. The system according to claim 1, wherein said storage means further contains landmark information and wherein said display control means, in a second mode of operation, retrieves items of said landmark information pertaining to landmarks in a vicinity of the present position and displays the retrieved landmark information on the structure-shape map displayed on said display means.

13. The system according to claim 12, wherein said display control means displays a landmark as landmark information.

14. The system according to claim 12, wherein said display control means retrieves said information within a range in a direction of travel from the present position, said range being varied according to a vehicle speed.

15. The system according to claim 12, wherein said display control means retrieves said information within a predetermined angular range in a direction of travel.

16. The system according to claim 12, wherein said display control means retrieves said information within a predetermined distance range in a direction of travel.

17. The system according to claim 1, wherein said storage means further contains landmark information and wherein said display control means, in a second mode of operation, retrieves items of said landmark information for landmarks around a suggested intersection.

18. The system according to claim 1 wherein said structures are displayed in accordance with respective classifications to which said structures are assigned, in different display modes for each of said classifications.

19. The system according to claim 1 further comprising vehicle speed sensing means for sensing vehicle speed,
wherein said other information includes a plurality of color palettes, each color palette providing a different color for each classification of the plural structures, each of said color palettes having data for a different set of colors, and
wherein said display control means controls the display on said display means to depict the structures in colors conforming to one of said color palettes and changes the display to correspond to another of said color palettes responsive to change in the sensed speed.

20. The system according to claim 1 wherein said display control means controls said display means to display either, in the first and second modes, the structure-shape map showing the shapes of the plural structures or, in a third mode, a guidance map without depiction of said planar shapes, one of said modes being selected to accordance with proximity to a predetermined location.

21. The system according to claim 1 wherein said shapes are planar shapes and wherein said shape information is stored in said storage means in the form of a string of map coordinates.

22. A navigation system for calculating a route to an entered destination and for providing guidance by a display and/or voice according to a present position, said navigation system comprising:
present-position sensing means for sensing the present position;
vehicle speed sensing means for sensing vehicle speed;
route calculating means for calculating a route to the entered destination;
storage means containing structure-shape map data including shape information representing shapes of structures and landmarks, said structures including at least roads, facilities and buildings, and information regarding said structures linked to said shape information and including guidance information inclusive of landmark information;
retrieval means for retrieving, from said storage means, information for said roads;
display means for displaying a structure-shape map, with the shapes of structures and landmarks along the calculated route and indication of the sensed present position depicted thereon; and
display control means for drawing the shapes of the structures and landmarks based on said stored shape information and in accordance with movement of the sensed present position, for restricting the quantity of shape information which is drawn and displayed on said display means to shape information for structures within a predefined area around the present position, on the basis of the vehicle speed sensed by said vehicle speed sensing means, thus forming the structure-shape map, and for superimposing, within an area smaller than the displayed structure-shape map, only the retrieved road information on the structure-shape map.

23. The system according to claim 22 wherein said shapes are planar shapes and wherein said shape information is stored in said storage means in the form of a string of map coordinates.

24. A navigation system for providing road guidance by displaying a structure-shape map showing building shapes and roads, said navigation system comprising:
vehicle speed sensing means for sensing vehicle speed;
recording-medium read means for reading out, from a recording medium, structure-shape map data including shape information for shapes of structures including at least roads, facilities and buildings and information relating to the structures linked to the shape information and for reading out a program for displaying the structure-shape map;
non-volatile recording means for storing a program;
program read means for reading the program read out by said recording-medium read means into said non-volatile recording means;
display means for displaying said structure-shape map showing the shape of each of said structures and a detected present position by executing the program read into said non-volatile recording means by said program read means on the basis of the data recorded on said recording medium and in accordance with movement of the detected position; and
display control means for restricting the quantity of shape information which is displayed on said display means, to shape information for structures within a predefined area around the present position, on the basis of the vehicle speed sensed by said vehicle speed sensing means,
processing means for selecting information relating to a specific road and for overlaying, within an area smaller than the displayed structure-shape map, only the selected road information on the structure-shape map.

25. The system according to claim 24 wherein the structure-shape map data for shapes of the plural structures is encoded on said recording medium as a string of map coordinates.

26. A recording medium for a navigation system which provides road guidance by displaying a structure-shape map showing shapes of various structures including buildings, facilities, and roads, with a detected present position shown on said structure-shape map, said recording medium having encoded thereon:

structure-shape map data including shape data for the shape of each of the various structures; and a program for drawing the shapes of the various buildings, facilities and roads to form the structure-shape map in accordance with movement of the detected present position, for restricting the quantity of shape information which is drawn and displayed on said display means to shape information for structures within a predefined area around the present position, on the basis of a sensed vehicle speed, for selecting information relating to roads, for drawing the selected road-related information on the structure-shape map and for displaying the structure shape map with only the selected road-related information superimposed thereon, within an area smaller than the displayed structure-shape map.

27. The recording medium according to claim 26, wherein said program has a routine for selectively retrieving a portion of said road-related information relating to roads in a vicinity of a detected present position.

28. The recording medium according to claim 26, wherein said structure-shape map data further includes landmark information data and wherein said program has a routine for retrieving landmark information data for landmarks in a vicinity of the present position and for, in a second mode of operation, displaying the retrieved landmark information.

29. The recording medium according to claim 26 wherein said shapes are planar shapes and wherein each shape is represented by structure-shape map data in the form of a string of map coordinates.

30. In a navigation system for a vehicle, which searches for a route to a destination and provides route guidance, a vehicular navigation system having a re-search function, said system comprising:

a present-position sensing unit for sensing a present position of a vehicle equipped with said navigation system;

an information storage device in which map information and other route information necessary for a route search and route guidance have been stored;

an input unit for entering a location such as a destination and also entering an instruction to execute a search for a route to said destination from the present position sensed by said present-position sensing unit;

an output unit for outputting information for route guidance; and a central processor for executing a search for a route to said destination from said present position on the basis of said map information, temporarily storing the route found by the search, and outputting, to said output unit, a signal for giving route guidance based on said route;

wherein, upon detection of entry into a parking lot, said central processor judges a distance from said parking lot to said destination, executes a re-search for a route from said parking lot to said destination, and outputs the route found by said re-search.

31. The system according to claim 30, wherein said central processor executes said re-search on condition that said parking lot is within a predetermined distance from said destination and not in close proximity of said destination.

32. The system according to claim 30, wherein if said parking lot is not within a predetermined distance from said destination, said central processor judges said parking lot to be an mid-route location on the way to said destination, and does not execute a re-search.

33. The system according to claim 30, wherein if said parking lot is in close proximity of said destination, said central processor terminates said guidance.

34. The system according to claim 30, wherein:

said information storage device stores, as said map information, structure-shape map data for name, location, classification and planar shape of each of various structures including roads, facilities and buildings, and for detailed information regarding each of said various structures, and said central processor outputs a structure-shape map for the route to said destination found by said re-search, on the basis of said structure-shape map data stored in said information storage device.

35. The system according to claim 30, wherein said shape map displays shapes of structures in different display modes according to features of the structures with priority given to names of the structures.

36. The system according to claim 30, wherein said central processor prints out said shape map.

* * * * *